United States Patent
Fukushima et al.

(10) Patent No.: US 8,525,531 B2
(45) Date of Patent: Sep. 3, 2013

(54) VARIABLE CAPACITOR, POSITION INDICATOR, AND INPUT DEVICE

(75) Inventors: Yasuyuki Fukushima, Saitama (JP); Hiroyuki Fujitsuka, Saitama (JP)

(73) Assignee: Wacom Co., Ltd., Saitama (JP)

( * ) Notice: Subject to any disclaimer, the term of this patent is extended or adjusted under 35 U.S.C. 154(b) by 133 days.

(21) Appl. No.: 13/227,347

(22) Filed: Sep. 7, 2011

(65) Prior Publication Data
US 2012/0074962 A1   Mar. 29, 2012

(30) Foreign Application Priority Data

Sep. 27, 2010   (JP) .................................. 2010-215621

(51) Int. Cl.
*G01R 27/26* (2006.01)

(52) U.S. Cl.
USPC ............ 324/661; 324/660; 324/662; 324/658

(58) Field of Classification Search
USPC ....... 324/658–690; 345/173–178; 178/19.03
See application file for complete search history.

(56) References Cited

U.S. PATENT DOCUMENTS

| | | | | |
|---|---|---|---|---|
| 5,206,785 | A * | 4/1993 | Hukashima | 361/283.2 |
| 6,326,565 | B1 * | 12/2001 | Holtzman et al. | 178/19.01 |
| 6,801,192 | B2 * | 10/2004 | Fujitsuka et al. | 345/179 |
| 7,898,532 | B2 * | 3/2011 | Lapstun et al. | 345/179 |
| 2001/0038384 | A1 | 11/2001 | Fukushima et al. | |
| 2008/0180092 | A1 | 7/2008 | Fukushima et al. | |
| 2008/0257613 | A1 * | 10/2008 | Katsurahira | 178/19.04 |
| 2009/0114459 | A1 * | 5/2009 | Fukushima et al. | 178/19.03 |
| 2010/0060300 | A1 * | 3/2010 | Muller et al. | 324/686 |
| 2010/0207607 | A1 | 8/2010 | Katsurahira et al. | |
| 2012/0314543 | A1 * | 12/2012 | Lee | 367/189 |

FOREIGN PATENT DOCUMENTS

| | | |
|---|---|---|
| EP | 1538516 A2 | 6/2005 |
| EP | 2187288 A2 | 5/2010 |
| JP | 63070326 A | 3/1988 |
| JP | 4096212 A | 3/1992 |

OTHER PUBLICATIONS

Extended European Search Report for corresponding EP Application No. 11182718.4, dated Jan. 23, 2012, 3 pages.

* cited by examiner

*Primary Examiner* — Huy Q Phan
*Assistant Examiner* — Adam Clarke
(74) *Attorney, Agent, or Firm* — Seed IP Law Group PLLC

(57) ABSTRACT

A variable capacitor is provided for use with an electronic circuit board including a first terminal portion and a second terminal portion, to be built in a position indicator. The variable capacitor includes a dielectric having a first surface portion and a second surface portion opposite to the first surface portion, and a conductive elastic member having a board coupling portion and a dielectric contacting portion. The first terminal portion is coupled to the first surface portion, the second terminal portion is coupled to the board coupling portion, and the dielectric contacting portion is disposed separately from the second surface portion so as to face the second surface portion and is configured to be deformed to come in contact with the second surface portion of the dielectric. The variable capacitor is configured such that a contact area between the second surface portion and the dielectric contacting portion is changed in correspondence to a depressing force, which is applied against the dielectric contacting portion in a direction toward the dielectric, thereby changing an electrostatic capacitance of the variable capacitor.

19 Claims, 19 Drawing Sheets

TOP PLAN VIEW

BOTTOM PLAN VIEW

CROSS SECTIONAL VIEW

TOP PLAN VIEW OF CONDUCTIVE ELASTIC PORTION 15c

TOP PLAN VIEW

BOTTOM PLAN VIEW

TOP PLAN VIEW

TRANSVERSE CROSS SECTIONAL VIEW

VARIABLE CAPACITOR, POSITION INDICATOR, AND INPUT DEVICE

CROSS REFERENCE TO RELATED APPLICATION

The present application claims priority under 35 U.S.C. 119(a) of Japanese Application No. 2010-215621, filed Sep. 27, 2010, the entire content of which is incorporated herein by reference.

BACKGROUND OF THE INVENTION

1. Field of the Invention

The present invention relates to a variable capacitor whose capacitance value is changed in accordance with a pressure or a displacement applied thereto from the outside, a position indicator using the variable capacitance, and an input device using the position indicator.

2. Description of the Related Art

In recent years, an input device has been used with a personal computer and the like. The input device is composed, for example, of a position indicator and a position detector. In this case, the position indicator is formed as of a pen type. The position detector has an input surface to which a pointing operation, characters, figures and the like are inputted by using the position indicator.

A variable capacitor as described in Japanese Patent Laid-Open No. Hei 4-96212 (hereinafter referred to as Patent Document 1) has been used in a pen-pressure detecting portion of the position indicator. The variable capacitor as described in Patent Document 1 includes a first electrode and a second electrode. The first electrode is mounted to one surface of a dielectric. The second electrode is disposed on the other surface of the dielectric and has flexibility. The variable capacitor includes a section for separating the second electrode and the other surface of the dielectric by a small space, except for a portion of the second electrode and the other surface of the dielectric, and a section for applying a relative pressure or displacement between the second electrode and the dielectric.

FIGS. 21A and 21B are schematic views each showing a concrete construction of a conventional variable capacitor. FIG. 21A is a schematic view showing an initial state in the conventional variable capacitor, and FIG. 21B is a schematic view showing a state in which a pressure is applied to the conventional variable capacitor.

The variable capacitor 200 includes a dielectric 201 having approximately a disc-like shape, a first electrode 202, and a second electrode 203. In this case, the first electrode 202 is mounted on one surface 201a of the dielectric 201. The second electrode 203 is disposed on the other surface 201b opposite to the one surface 201a of the dielectric 201. The second electrode 203 has flexibility and is disposed on the other surface 201b of the dielectric 201 through a ring-like spacer 204. In addition, a rod-like core body 210 is provided on a side of the second electrode 203 opposite to the dielectric 201 side through an elastic body 205.

A first terminal 206 is provided on the one surface side of the first electrode 202. The first terminal 206 is composed of a disc-like flange portion 206a, and a lead portion 206b extending approximately from a center of one surface of the disc-like flange portion 206a. When a pen pressure is applied to the variable capacitor 200, the flange portion 206a comes in contact with one surface of the first electrode 202 to be electrically connected to the first electrode 202.

A second terminal 207 is provided in an end (edge) portion of the second electrode 203. The second terminal 207 is composed of a disc-like flange portion 207a and a lead portion 207b extending approximately from a center of one surface of the flange portion 207a similarly to the case of the first terminal 206. When the pen pressure is applied to the variable capacitor 200, the flange portion 207a is in contact with an end portion of one surface of the second electrode 203 and is electrically connected to the first electrode 203.

In the variable capacitor 200, in a state in which neither the pressure nor the displacement is applied to the core body 210 (initial state), a small space is defined between the other surface 201b of the dielectric 201 and the second electrode 203 by a spacer 204. As shown in FIG. 21B, when the pressure is applied to the core body 210, both of the elastic body 205 and the second electrode 203 are depressed by the core body 210 to be elastically deformed. As a result, the second electrode 203 comes in contact with the other surface 201b of the dielectric 201. When a contact area between the second electrode 203 and the other surface 201b of the dielectric 201 is increased, a value of an electrical capacitance defined between the first and second terminals 206 and 207 is increased. As a result, a change in value of the electrical capacitance defined between the first and second terminals 206 and 207 is detected, thereby detecting the pressure (pen pressure) applied to the core body 210.

SUMMARY OF THE INVENTION

The conventional variable capacitor 200 described with reference to FIGS. 21A and 21B is actually formed within a housing member. Specifically, with respect to assembly of the variable capacitor 200, as shown in FIG. 22, the dielectric 201 having the first electrode 202 provided thereon, the spacer 204, the second electrode 203, and the elastic body 205 are laminated in this order to be formed within the housing member 221.

In this case, the first terminal 206 is connected to the first electrode 202, and the second terminal 207 is connected to the end (edge) portion of the second electrode 203. Also, both of a cap body 72 for holding the core body 210 and a second housing member 222 are inserted from a lower side of the first housing member 221 into the first housing member 221, thereby forming one variable capacitor 200.

Therefore, the conventional variable capacitor 200 is formed from the nine parts or components: (1) the first terminal 206; (2) the second terminal 207; (3) the first housing member 221; (4) the dielectric 201 having the first electrode 202 provided thereon; (5) the spacer 204; (6) the second electrode 203; (7) the elastic body 205; (8) the cap body 72 for holding the core body 210; and (9) the second housing member 222.

As described above, there are a large number of parts or components in the conventional variable capacitor 200. In addition, the size of the conventional variable capacitor 200 is relatively small because the conventional variable capacitor 200 is accommodated in a pen-type position indicator. For this reason, it is rather difficult and time-consuming to manufacture the conventional variable capacitor 200 in some cases.

In light of the foregoing, according to one aspect of the present invention, a variable capacitor is provided which is simpler to construct, without having its performance compromised. Further, a position indicator using such variable capacitor, and an input device including such position indicator are provided.

According to an embodiment of the present invention, a variable capacitor is provided for use with an electronic circuit board including a first terminal portion and a second terminal portion, which are all to be built in a position indicator. The variable capacitor includes a dielectric having a first surface portion and a second surface portion opposite to said first surface portion, and a conductive elastic member having a board coupling portion and a dielectric contacting portion. The first terminal portion is coupled to the first surface portion, the second terminal portion is coupled to the board coupling portion, and the dielectric contacting portion is disposed separately from the second surface portion so as to face the second surface portion and is further configured to be deformed to come in contact with the second surface portion of the dielectric. A contact area between the second surface portion and the dielectric contacting portion is changed in correspondence to a depressing force, which is applied against the dielectric contacting portion in a direction toward the dielectric, thereby changing an electrostatic capacitance of the variable capacitor.

In the variable capacitor described above, the first terminal portion of the electronic circuit board is coupled to the first surface portion of the dielectric, and the second terminal portion of the electronic circuit board is coupled to the board coupling portion of the conductive elastic member. The dielectric contacting portion of the conductive elastic member is disposed separately (spaced) from the second surface portion of the dielectric so as to face the second surface portion of the dielectric, but is configured to be deformed toward the second surface portion when a depressing force is applied. In other words, the dielectric contacting portion and the second surface portion of the dielectric come in contact with each other when the depressing force is applied. The contact area between the dielectric contacting portion and the second surface portion of the dielectric is changed, thereby changing the electrostatic capacitance of the variable capacitor.

Therefore, when a depressing force is applied, a connection system is formed as follows: the first terminal portion of the electronic circuit board→the first surface portion of the dielectric→the second surface portion of the dielectric→the dielectric contacting portion of the conductive elastic member→the board coupling portion of the conductive elastic member→the second terminal portion of the electronic circuit board. In the connection system, the variable capacitor is provided whose electrical capacitance changes in accordance with the contact state, corresponding to the depressing force, between the second surface portion of the dielectric and the dielectric contacting portion of the conductive elastic member.

As a result, a variable capacitor is provided, which has a very simple construction including two members: the dielectric and the conductive elastic member. In addition, the performance of the variable capacitor is not degraded as compared with that of a conventional variable capacitor. In other words, it is possible to realize a variable capacitor, which is simpler to construct and yet maintains high performance.

According to another embodiment of the present invention, a position indicator is provided including the variable capacitor as described above, an electronic circuit board having electronic circuit provided therein, and a resonance circuit having the variable capacitor as its element.

Therefore, it is possible to realize a position indicator using the variable capacitor, which is simpler to construct and maintains high performance.

According to still another embodiment of the present invention, an input device is provided including a position indicator and a position detector having a detection surface configured to detect a position indicated by the position indicator. The position indicator includes a case, an elongated core body accommodated within the case and having one end thereof protruding from the case while having another end thereof accommodated within the case, a variable capacitor whose electrical capacitance changes when an external force is applied thereto through the core body, and an electronic circuit board having a first terminal portion and a second terminal portion. The variable capacitor of the position indicator includes a dielectric having a first surface portion and a second surface portion opposite to the first surface portion, and a conductive elastic member having a board coupling portion and a dielectric contacting portion. The first terminal portion is coupled to the first surface portion, the second terminal portion is coupled to the board coupling portion, and the dielectric contacting portion is disposed separately from the second surface portion so as to face the second surface portion and is configured to be deformed to come in contact with said second surface portion. A contact area between the second surface portion and the dielectric contacting portion is changed in correspondence to a depressing force, which is applied against the dielectric contacting portion in a direction toward the dielectric, thereby changing an electrostatic capacitance of the variable capacitor.

Therefore, it is possible to realize an input device using the position indicator of the present invention.

As set forth hereinabove, according to various embodiments of the present invention, it is possible to realize a variable capacitor which is simpler to construct and maintains high performance. In addition, it is possible to realize a position indicator using the variable capacitor, and an input device using such position indicator including the variable capacitor.

DETAILED DESCRIPTION OF THE PREFERRED EMBODIMENTS

Figure 1:
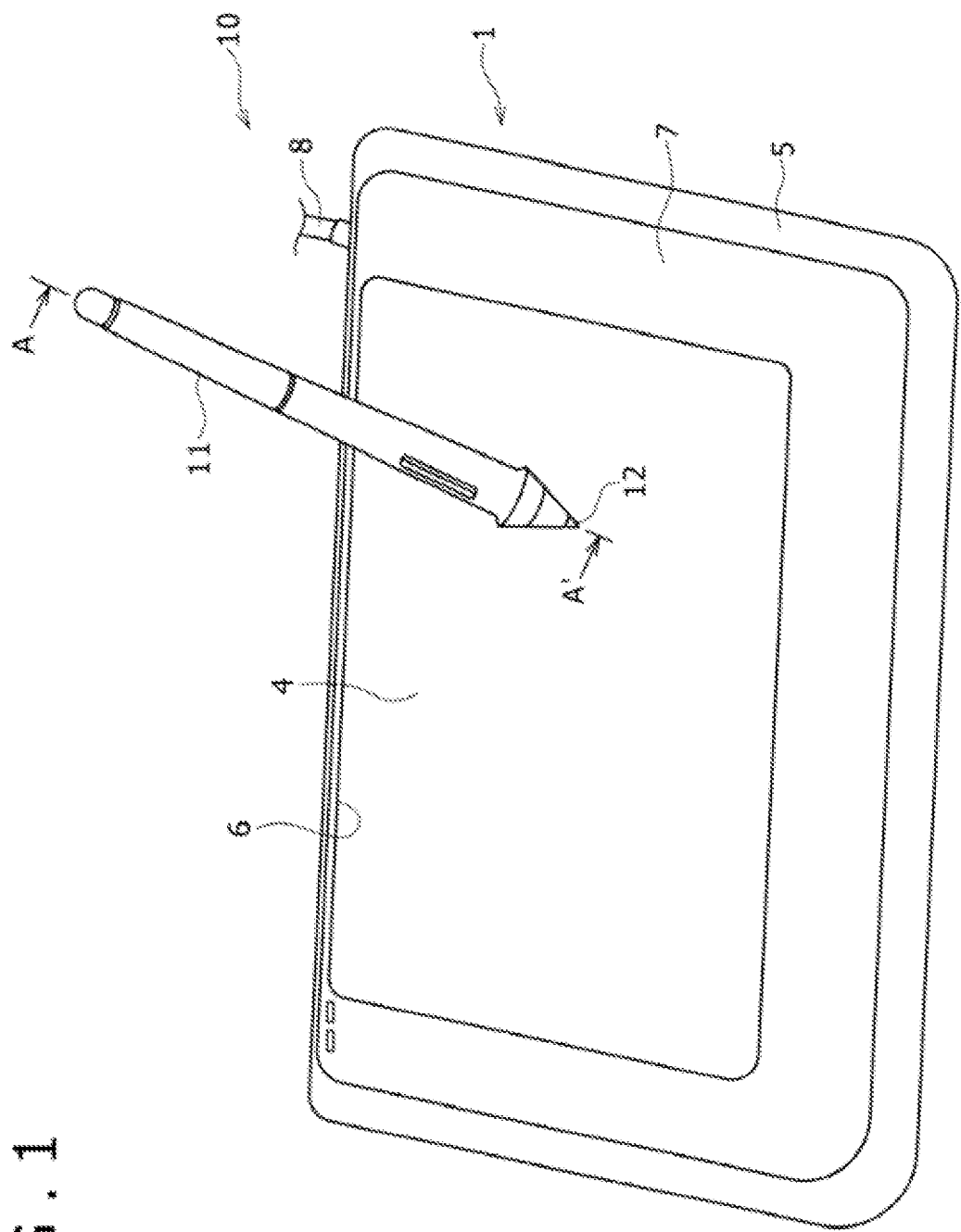
FIG. 1 is a perspective view showing a construction of an embodiment of an input device according to the present invention.

The preferred embodiments of the present invention will be described in detail hereinafter with reference to the accompanying drawings. It is noted that members common to the figures are designated by the same reference numerals or symbols, respectively. In an embodiment which will be described below, an accommodating portion claimed in the appended claims is embodied as a holding hole 15ch for a board and the like. A board coupling portion claimed in the appended claims is embodied as a groove portion 15ck provided in a holder portion 15c1 for a board and the like in one embodiment. Also, a core coupling portion claimed in the appended claims is embodied as a core body holding hole 15cp and a core body holder 15c2 in one embodiment. It should be noted that the present invention is by no means limited to one of these embodiments which will be described below.

[Input Device]

Firstly, a schematic construction of an embodiment of the input device according to the present invention will be described with reference to FIG. 1. FIG. 1 is a perspective view showing the schematic construction of the embodiment of the input device according to the present invention.

The input device 10 is composed of a position detector 1, and a position indicator 2 for inputting information to the position detector 1.

[Position Detector 1]

The position detector 1 is connected to an external apparatus such as a personal computer or a Personal Digital Assistant (PDA) via a cable 8, whereby the position detector 1 is used as an input device for such an external apparatus. It is noted that although not specifically illustrated, such a position detector 1 may be built in the personal computer or the like.

The position detector 1 is composed of a detecting portion 4 and a chassis 5. In this case, the detecting portion 4 detects a position indicated by the position indicator 2, which will be described later. The chassis 5 forms approximately a hollow thin rectangular parallelepiped and has the detecting portion 4. The chassis 5 has an upper chassis 7 and a lower chassis (not shown). In this case, the upper chassis 7 has an opening portion 6 for exposing a detection surface of the detecting portion 4. The upper chassis 7 is superposed on the lower chassis (not shown). The detecting portion 4 is fitted into the quadrangular opening portion 6 of the upper chassis 7, so that the input surface of the detecting portion 4 is exposed through the quadrangular opening portion 6. The position detector 1 having such a construction receives an input of characters, figures or the like, made by a pointing operation of the position indicator 2, which will be described below.

[Position Indicator 2]

Figure 2:
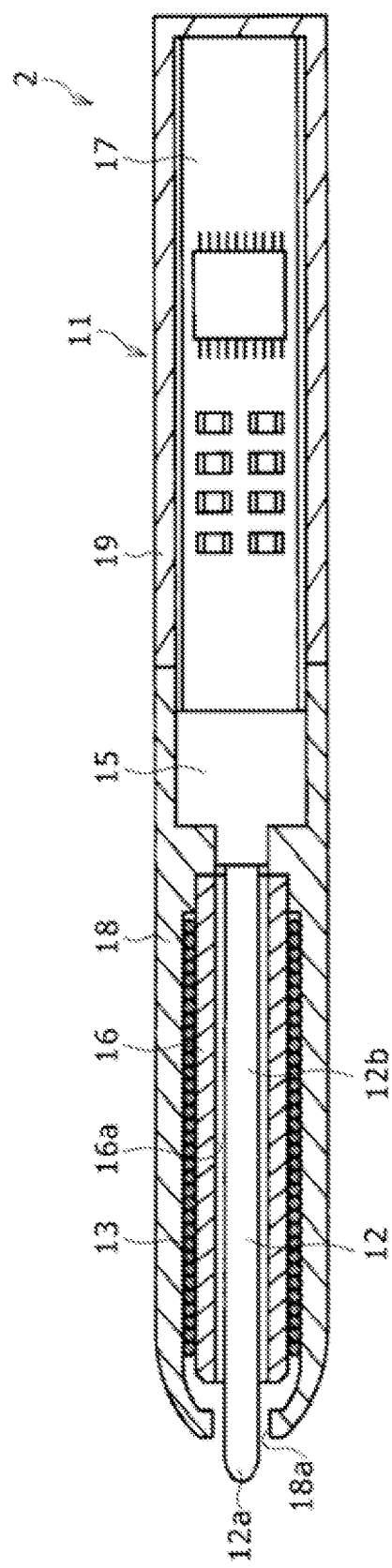
FIG. 2 is a cross sectional view taken along line A-A' of a position indicator shown in FIG. 1.

Next, a description will be given with respect to a schematic construction of the position indicator 2 with reference to FIG. 2. FIG. 2 is a cross sectional view taken along line A-A' of the position indicator 2 shown in FIG. 1.

The position indicator 2 serves to indicate a position for the position detector 1 by using an electromagnetic induction system. The position indicator 2 has a resonance circuit which enters into resonance with an electric wave having a specific frequency and transmitted thereto from the position detector 1. The position indicator 2 transmits a resonance signal detected by the resonance circuit to the position detector 1, thereby indicating a position for the position detector 1.

As shown in FIG. 2, the position indicator 2 is constructed so as to include a case 11 showing a concrete example of a chassis, a core body 12, a position indicating coil 13, a variable capacitor 15, a ferrite core 16, and a printed wiring board 17.

The case 11 is formed as an external packaging portion of the position indicator 2. The case 11 has a bottomed cylindrical shape whose one end is closed. The case 11 is composed of a first case 18 and a second case 19 which are assembled, and coupled with the first case 18 and the second case 19 being axially superposed on each other. The first case 18 has approximately a conical shape at one end side in an axial direction, and has an opening portion 18a at a tip of that one end side. The other end of the first case 18 in the axial direction is open.

The second case 19 has a cylindrical shape whose one end in the axial direction is open and whose other end is closed. The first case 18 and the second case 19 are disposed on the same axis line, and are fixed to each other by using a firmly fixing section such as an adhesive agent or fixing screws. The printed wiring board 17 having electronic parts or components mounted thereto is firmly fixed to the second case 19 by using a firmly fixing section such as an adhesive agent or fixing screws. The ferrite core 16 is accommodated in the first case 18.

The ferrite core 16, for example, has a cylindrical shape, and a core body 12 is inserted into a cylindrical hole 16a of the ferrite core 16. An indication portion 12a of the core body 12 protrudes from one end side in the axial direction of the ferrite core 16. In addition, a position indicating coil 13 composing a resonance circuit is wound around the outer periphery of the ferrite core 16 to be mounted thereto. Both ends (not shown) of the position indicating coil 13 are electrically connected to opposite terminals of corresponding one of the electronic parts or components firmly fixed to the printed wiring board 17, respectively. Electronic parts or components composing the resonance circuit are mounted to the printed wiring board 17.

The core body 12 is made from approximately a rod-like member, and is accommodated in the case 11 along the axial direction of the case 11. The core body 12 is composed of the indication portion 12a, and an axis portion 12b. In this case, the indication portion 12a has a role of a pen tip at one end of the core body 12 in the axial direction. The axis portion 12b is continuously formed from the indication portion 12a. The indication portion 12a is formed approximately in a conical shape. The indication portion 12a protrudes from the opening portion 18a of the first case 18 toward the outside when the core body 12 is accommodated in the case 11. The variable capacitor 15 is mounted to the other end of the axis portion 12b in the axial direction.

[Variable Capacitor 15]

Figure 3:
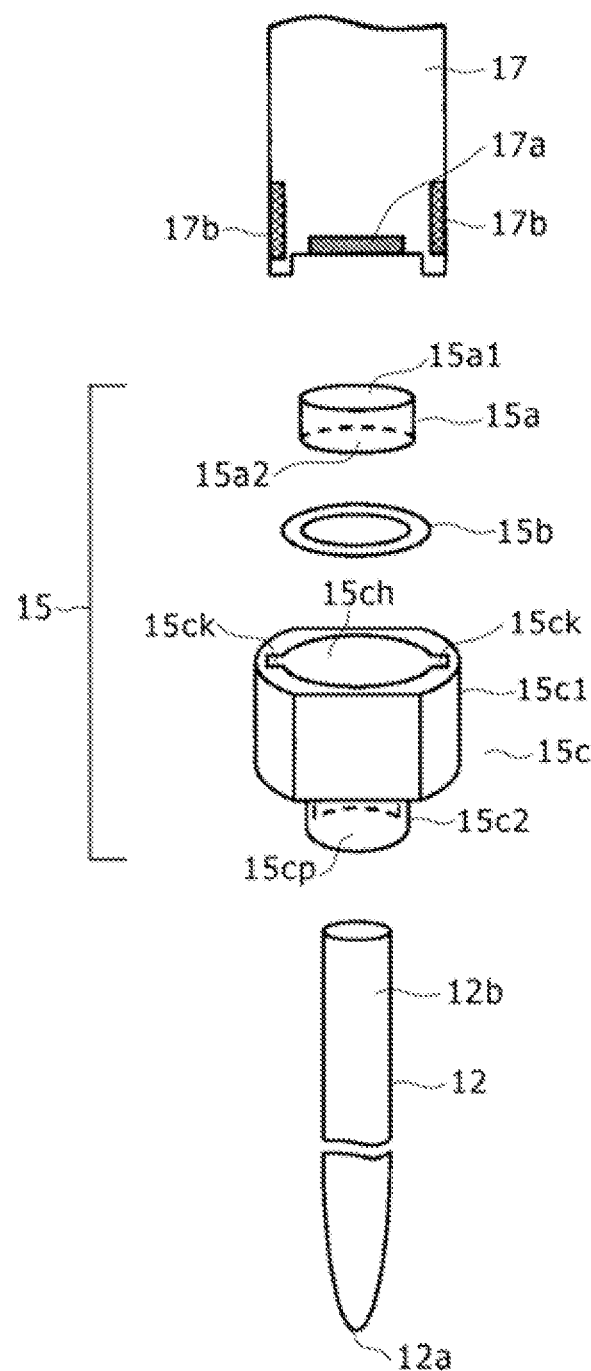
FIG. 3 is an exploded perspective view of a variable capacitor in the embodiment of the input device shown in FIG. 1.
Figure 4A:
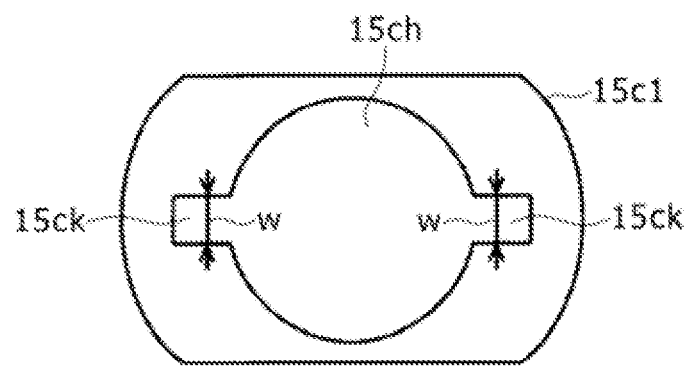
FIGS. 4A and 4B are a top plan view and a bottom plan view, respectively, of a conductive elastic member of the variable capacitor shown in FIG. 3.
Figure 4B:
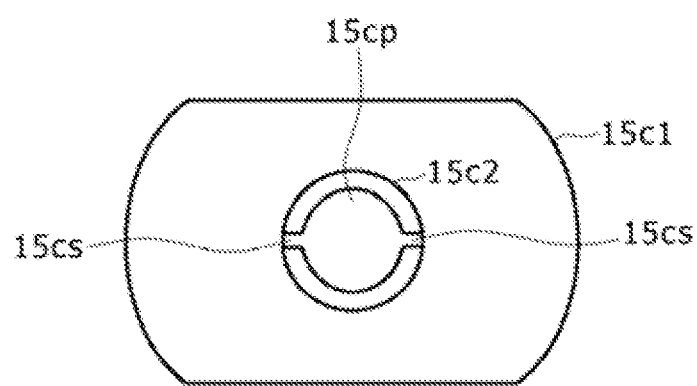
Figure 5:
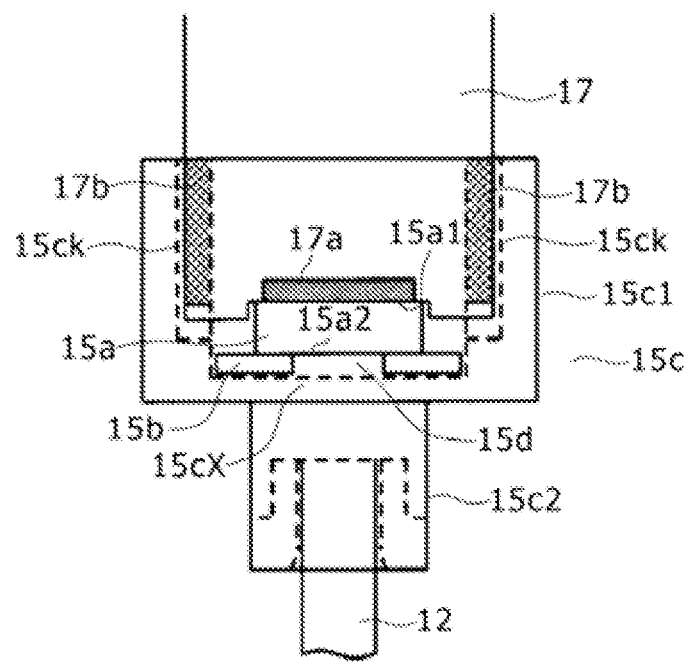
FIG. 5 is a cross sectional view of the variable capacitor portion when both of a printed wiring board and a core body are mounted.
Figure 6A:
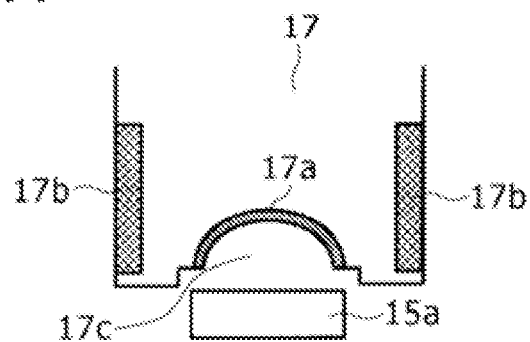
FIGS. 6A and 6B are cross sectional views explaining an example of joining between a printed wiring board and a dielectric.
Figure 6B:
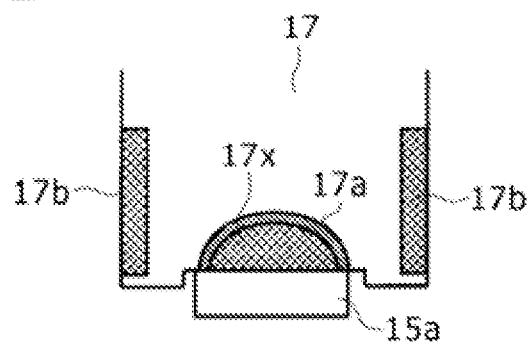

Next, the variable capacitor 15 of the position detector 1 composing an embodiment of the input device will be described with reference to FIG. 3 to FIGS. 6A and 6B. FIG. 3 is an exploded perspective view of the variable capacitor 15. FIGS. 4A and 4B are a top plan view and a bottom plan view, respectively, of a conductive elastic member 15c of the variable capacitor 15. In addition, FIG. 5 is a cross sectional view of the variable capacitor 15 portion when both of the printed wiring board 17 and the core body 12 are mounted to the variable capacitor 15. Also, FIGS. 6A and 6B are cross sectional views explaining an example of joining between the printed wiring board 17 and a dielectric 15a.

The variable capacitor 15 is a capacitor whose capacitance value is changed so as to correspond to a pressure (pen pressure) applied to the position indicator 2. The variable capacitor 15 detects the pen pressure applied to the core body 12 as a corresponding change in capacitance value, and thus serves as a pen pressure detecting portion of the position indicator 2.

As shown in FIG. 3, the variable capacitor 15 is composed of the dielectric 15a, a spacer (spacing member) 15b, and the conductive elastic member 15c. The dielectric 15a, the space (spacing member) 15b, and the conductive elastic member 15c are held between the printed wiring board 17 and the core body 12, to be used as the variable capacitor 15 of the position indicator 2.

The dielectric 15a is formed in a columnar shape having a first surface portion 15a1 and a second surface portion 15a2 opposite to each other. In the illustrated embodiment, for example, the dielectric 15a is 2.95 mm in outer diameter, 1 mm in thickness, and 160 pF (permittivity: 4,000 F/m) in capacitance value. Here, the unit, mm, means a millimeter, the unit, pF, means a picofarad, and the unit, F/m, means a meter per farad.

It is noted that numerical values of the dielectric 15a provided above are examples only, and thus various numerical values can be adopted in accordance with the size of the position indicator 2 having the variable capacitor 15 mounted thereto, the size of the printed wiring board 17, and the like. In one embodiment, the second surface portion 15a2 of the dielectric 15a is subjected to mirror polishing, thereby increasing the degree of adhesion to a dielectric contacting portion 15cX of the conductive elastic member 15c (see FIG. 5), which will be described later. In addition, various kinds of materials such as ceramics and plastic can be used as the material for the dielectric 15a as long as they meet the conditions of the capacitance, the permittivity, and the like.

The spacer (spacing member) 15b is formed in a ring-like (annular) shape. An inner diameter of the spacer 15b is smaller than a diameter of the dielectric 15a and an outer diameter of the spacer 15b is larger than the diameter of the dielectric 15a and is slightly smaller than an inner diameter of the conductive elastic member 15c, which will be described later, into which the spacer is accommodated. Adoption of such a construction can prevent position shift of the spacer 15b within the conductive elastic member 15c.

When the spacer 15b is made to correspond to the dielectric 15a having the size exemplified above, the spacer 15b is set to be about 2.6 mm in inner diameter, and about 4.3 mm in outer diameter. In addition, the thickness of the spacer 15b is set equal to or smaller than 125 µm, for example. Of course, the numerical values shown here are examples only, and thus suitable material values can be adopted based on the size and the like of the dielectric 15a. In addition, although various kinds of insulators can be used as the material for the spacer 15b, the spacer 15b may be formed from a Polyethylene Terephthalate (PET) film or a polyimide film, for example.

A holder portion 15c1 for a board and the like, and the core body holder portion 15c2, are formed integrally with each other, by using a conductive rubber, into the conductive elastic member 15c.

The holder portion 15c1 for a board and the like is a cylindrical portion which has an opening portion having a diameter slightly larger than the outer diameter of the spacer 15b, and which is provided with a holding hole (accommodating portion) 15ch for a board and the like having a predetermined depth while maintaining an area of the opening portion. The spacer 15b, the dielectric 15a, and a terminal portion of the printed wiring board 17 are accommodated in order from the lower side in the holding hole 15ch for a board and the like to be held therein. It is noted that a side of the holder portion 15c1 for a board and the like opposite to the opening portion thereof is provided with a closed bottom surface. This bottom surface composes the dielectric contacting portion 15cX, which is configured to contact the second surface portion 15a2 of the dielectric 15a (see FIG. 5).

In addition, as shown in FIG. 3, a paired groove portions 15ck composing a board coupling portion are provided in respective positions facing each other of the outer periphery of the holding hole 15ch for a board and the like of the holder portion 15c1 for a board and the like. That is to say, as shown in a top plan view of the conductive elastic member 15c of FIG. 4A, a construction is adopted such that the paired groove portions 15ck composing the board coupling portion into which the printed wiring board 17 is inserted are provided in the respective positions facing each other of the opening portion of the holding hole 15ch for a board and the like of the holder portion 15c1 for a board and the like.

A depth of each of the paired groove portions 15ck is set slightly shallower (shorter) than that of the holding hole 15ch for a board and the like (see FIG. 5). In addition, a width, w, of each of the paired groove portions 15ck shown in FIG. 4A is set slightly narrower than a thickness of the printed wiring board 17 inserted into the paired grooves 15ck. As a result, the printed wiring board 17 inserted into the paired grooves 15ck is held by the paired grooves 15ck, and the printed wiring board 17 is prevented from being easily detached from the holder portion 15c1 for a board and the like of the conductive elastic member 15c. Also, although details will be described later, a lead piece (terminal portion) provided in the printed wiring board 17 and the conductive elastic member 15c can be electrically connected to each other.

In addition, the holder portion 15c1 for a board and the like has a shape as shown in FIG. 4A, in which outer peripheral portions in a direction (in a vertical direction in FIG. 4A) intersecting with a diameter direction connecting the paired groove portions 15ck are cut away. Adoption of such a shape results in that the conductive elastic member 15c, which is hard to roll and is easy to handle, can be formed without wastefully using a conductive rubber.

On the other hand, the core body holder 15c2 is provided in such a way that a (closed) bottom surface thereof is flush with the bottom surface of the holder portion 15c1 for a board and the like. The core body holder portion 15c2 is provided in such a way that an outer diameter thereof is smaller than that of the holder portion 15c1 for a board and the like, and a center of the bottom surface of the holder portion 15c1 for a board and the like, and a center of the bottom surface of the core body holder 15c2 agree with each other.

The core body holder 15c2 is a cylindrical portion which has an opening portion having a diameter slightly smaller than an outer diameter of the axis portion 12b of the core body 12 and which is provided with a core body holding hole (core body coupling portion) 15cp having a predetermined depth while maintaining an area of the opening portion. As shown in FIG. 3, the axis portion 12b of the core body 12 is inserted into the core body holding hole 15cp to be held.

In addition, as shown in the bottom plan view of the conductive elastic member 15c of FIG. 4B, a construction is adopted such that paired slit portions (cut portions) 15cs are provided in respective positions facing each other of the opening portion of the core body holding hole 15cp of the core body holder portion 15c2. A depth of each of the paired slit portions 15cs is set slightly shallower (shorter) than that of the core body holding hole 15cp. Provision of the paired slit portions 15cs results in that it is easy to insert the core body 12 into the core body holding hole 15cp.

It is noted that the conductive rubber composing the conductive elastic member 15c is a synthetic rubber with which a conductive particle such as a carbon particle or a silver particle is mixed, and is a material having the flexibility and the elasticity as well as the conductivity. In general, conductive rubber is classified into one of two types: a rubber of a type in which an electrical resistance value depends on a pressure, that is, a rubber (pressure-sensitive rubber) of a type having a tendency such that a resistance value becomes small as a depressing force applied is larger, and a rubber (narrow conductive rubber) of a type in which an electrical resistance value does not depend on a pressure. Any of the two types of rubbers can be used as the material composing the conductive elastic member 15c.

Although the phrases such as flexibility and elasticity are the terms which are normally used interchangeably with each other, these phrases can be defined as follows. Flexibility is a property capable of being bent, or a property capable of being pliant. Thus, flexibility means that a material can be deformed when a depressing force is applied thereto, and can be restored back to the original state when the depressing force is removed. In this case, whether or not a size of the material itself is changed with respect to (along) the depressing direction is not relevant. On the other hand, elasticity means that a size of a material itself is reduced along a depressing direction when a depressing force is applied to the material, and the material can be returned back to the original state when the depressing force is removed. In this case, whether or not the material itself is bent with respect to the depressing direction is not relevant. Therefore, the conductive elastic member 15c (having flexibility) in the embodiment can be bent or contracted when the pressure is applied thereto and can be restored back to the original state when the pressure is removed.

As described above with reference to FIG. 3, in the variable capacitor 15 in the embodiment of the input device, both of the dielectric 15a and the spacer 15b are accommodated in the holding hole 15ch for a board and the like provided in the holder portion 15c1 for a board and the like of the conductive elastic member 15c. Also, the dielectric 15a, the spacer 15b, and the conductive elastic member 15c are held between the printed wiring board 17 and the core body 12, thereby serving as the variable capacitor 15 of the position indicator 2.

In an end portion of the printed wiring board 17, connected to (or received within) the variable capacitor 15 as shown in FIGS. 3 and 5, each of the two lateral side portions of the end portion is set slightly longer than a bottom side portion held between the two lateral side portions of the end portion. As further shown in FIGS. 3 and 5, a first lead piece (first terminal portion) 17a is provided in the bottom side portion of the printed wiring board 17, and second lead portions (second terminal portions) 17b are provided in both of the lateral side portions, respectively. The first terminal portion 17a and the second terminal portions 17b are connected to a predetermined circuit portion(s) provided on the printed wiring board 17 through respective lead lines (not shown).

The first lead piece 17a of the printed wiring board 17 is electrically connected to the first surface portion 15a1 of the dielectric 15a, and the dielectric 15a itself is firmly fixed to the printed wiring board 17. In this case, the first lead piece 17a of the printed wiring board 17 and the first surface portion 15a1 of the dielectric 15a are joined to each other by, for example, using a method such as a soldering method or a brazing method. As a result, the first lead piece 17a of the printed wiring board 17, and the first surface portion 15a1 of the dielectric 15a are electrically connected to each other, and the dielectric 15a is firmly fixed to the printed wiring board 17.

It is noted that the soldering method or the brazing method is an example of the firmly fixing method. Thus, the first lead piece 17a, and the first surface portion 15a1 of the dielectric 15a may be electrically connected to each other by using any of various kinds of conductive adhesive agents, and thus the dielectric 15a may be firmly fixed to the printed wiring board 17.

Both of the end portions of the lateral sides of the printed wiring board 17 are respectively fitted into the paired groove portions (board coupling portions) facing each other and provided in the outer peripheral portion of the holding hole 15ch for a board and the like of the holder portion 15c1 for a board and the like of the conductive elastic member 15c. As a result, as also described above, the second lead pieces 17b provided in both of the lateral side portions of the printed wiring board 17, respectively, are electrically connected to the conductive elastic member 15c.

Specifically, as shown in a cross sectional view of the variable capacitor 15 portion of FIG. 5, the ring-like spacer 15b is accommodated in the holding hole 15ch for a board and the like provided in the holder portion 15c1 for a board and the like of the conductive elastic member 15c so as to contact the bottom surface of the holding hole 15ch for a board and the like. Above the ring-like spacer 15b, the first surface portion 15a1 is electrically connected to the first lead piece 17a of the printed wiring board 17, and also the dielectric 15a firmly fixed to the printed wiring board 17 is accommodated together with the printed wiring board 17 from the opening portion of the holding hole 15ch for a board and the like.

In this case, both of the lateral side portions provided with the second lead pieces 17b of the printed wiring board 17, respectively, are fitted into the paired groove portions (board coupling portions) 15ck facing each other and provided in the outer peripheral portion of the holding hole 15ch for a board and the like. As a result, the second lead pieces 17b provided in both of the lateral side portions of the printed wiring board 17, respectively, are electrically connected to the conductive elastic member 15c through the respective groove portions 15ck composing the board coupling portions.

In this case, as shown in FIG. 5, the bottom surface portion of the holding hole 15ch for a board and the like of the holder portion 15c1 for a board and the like composing the dielectric contacting portion 15cX, and the second surface portion 15a2 of the dielectric 15a are separated (spaced) from each other by a thickness of the spacer 15b by the spacer 15b. That is to say, a space 15d is defined between the bottom surface portion of the holding hole 15ch for a board and the like of the holder portion 15c1 for a board and the like composing the dielectric contacting portion 15cX, and the second surface portion 15a2 of the dielectric 15a by the spacer 15b.

As shown in FIG. 5, the axis portion 12b of the core body 12 is fitted into the core body holding hole 15cp of the core body holder portion 15c2 of the conductive elastic member 15c. It is then supposed that a depressing force is applied to the dielectric 15a side of the core body 12 when, for example, the indication portion 12a of the core body 12 is pressed against the detecting portion 4 of the position detector 1.

In this case, the conductive elastic member 15c has elasticity and flexibility as well as conductivity. Therefore, the bottom surface portion (the dielectric contacting portion 15cX) of the holding hole 15ch for a board and the like of the board holder portion 15c1 is upward pressed toward the second surface portion 15a2 side of the dielectric 15a by the core body 12. Also, the application of the depressing force toward the dielectric 15a by the core body 12 results in that the bottom surface portion (the dielectric contacting portion 15cX) of the holding hole 15ch for a board and the like comes in contact with the second surface portion 15a2 of the dielectric 15a.

When the depressing force applied toward the dielectric 15a side of the core body 12 is released, the conductive elastic member 15c is returned back to the original state by the elasticity and flexibility of the conductive elastic member 15c. As a result, the operation state is returned back to the state such that the space 15d is defined between the bottom surface portion (the dielectric contacting portion 15cX) of the holding hole 15ch for a board and the like, and the second surface portion 15a2 of the dielectric 15a by the spacer 15b.

When the depressing force is not applied to the dielectric 15a side by the core body 12 in such a way, the space 15d is defined between the bottom surface portion (the dielectric contacting portion 15cX) of the holding hole 15ch for a board and the like, and the second surface portion 15a2 of the dielectric 15a, and therefore electrical connection is not formed.

However, when the depressing force is applied to the dielectric 15a side by the core body 12, the bottom surface portion (the dielectric contacting portion 15cX) of the holding hole 15ch for a board and the like, and the second surface portion 15a2 of the dielectric 15a come in contact with each other. In this case, there is formed a connection system as follows: the first lead piece 17a of the printed wiring board 17→the first surface portion 15a1 of the dielectric 15a→the second surface portion 15a2 of the dielectric 15a→the dielectric contacting portion 15cX of the conductive elastic member 15c→the board coupling portion 15ck of the conductive elastic member 15c→the second terminal portion 17b of the printed wiring board 17. Thus, the variable capacitor 15 is constructed whose electrical capacitance is changed in accordance with the contact state, corresponding to the depressing force, between the second surface portion 15a2 of the dielectric 15a, and the dielectric connecting portion 15cX of the conductive elastic portion 15c in the connection system.

As shown in FIGS. 3 and 5, the variable capacitor 15 in the illustrated embodiment can be basically composed of the three parts or components: the dielectric 15a; the spacer 15b; and the conductive elastic member 15c. The variable capacitor 15 having a very simple construction can be realized in this manner.

[Concrete Examples of Joining Between Printed Wiring Board 17 and First Surface Portion 15a1 of Dielectric 15a]

It has been described above that the first lead piece 17a of the printed wiring board 17, and the first surface portion 15a1 of the dielectric 15a are joined to each other by, for example, using the soldering method. In the variable capacitor 15 of the embodiment, for the purpose of reliably and firmly fixing the printed wiring board 17 to the first surface portion 15a1 of the dielectric 15a, a sample construction of a connection end of the printed wiring board 17 to (be connected to) the conductive elastic member 15c is provided and now described.

In the embodiment as shown in FIG. 6A, a semi-circular through hole (a cutout portion (or a holding hole)) for holding the solder as the conductive adhesive agent) 17c is provided in the first lead piece 17a portion of the connection end of the printed wiring board 17, to be connected to the conductive elastic member 15c. In other words, the bottom side portion of the printed wiring board 17 is cut into the semi-circular shape to provide the through hole 17c. As shown in FIG. 6A, the first lead piece 17a is provided so as to have an arc-like shape along the outer peripheral portion of the semi-circular through hole 17c.

As shown in FIG. 6B, the first surface portion 15a1 of the dielectric 15a is made to come in contact with the through hole 17c portion of the printed wiring board 17 constructed in such a way, and a solder 17x as the conductive adhesive agent is caused to flow into the through hole 17c portion, thereby carrying out the soldering. As a result, as shown in FIG. 6B, the through hole 17c is filled with the solder 17x. Also, when the solder 17x portion is solidified, the first surface portion 15a1 of the dielectric 15a, and the first lead piece 17a of the printed wiring board 17 are electrically connected to each other and also the dielectric 15a is firmly fixed to the printed wiring board 17.

Thus, in the illustrated embodiment, the construction is adopted such that the through hole 17c is provided in the connection end of the printed wiring board 17 to be connected to the conductive elastic member 15c, and the arc-like lead piece 17a is provided in the outer peripheral portion of the through hole 17c. As a result, the first lead piece 17a of the printed wiring board 17 and the first surface portion 15a1 of the dielectric 15a can be electrically connected to each other and also the dielectric 15a can be firmly fixed to the printed wiring board 17.

It is noted that although the through hole 17c has been described as being semi-circular here, the present invention is by no means limited thereto. For example, a through hole having a polygonal shape such as a triangular shape or a quadrangular shape may be provided, and the first lead piece may be provided in an outer periphery or edge of the through hole.

[Precision of Detection of Pen Pressure (Pressure) in Position Indicator 2]

As described above, the variable capacitor 15 composes the pen pressure detecting portion in the position indicator 2. Next, a description will be given regarding the precision in detection of the pen pressure (pressure) by the variable capacitor 15 of the embodiment described above.

Figure 7:
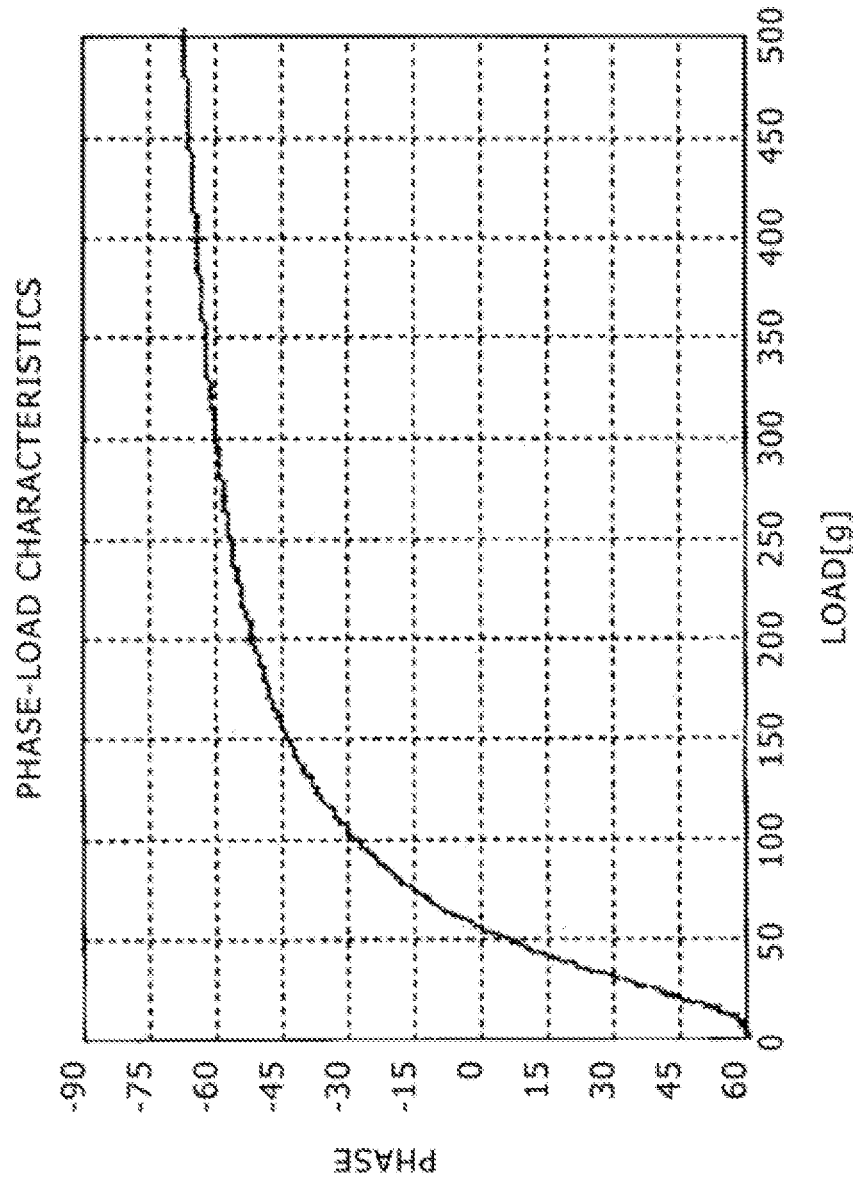
FIG. 7 is a graph representing pen pressure characteristics of the variable capacitor.

FIG. 7 is a graph showing phase-load characteristics of the variable capacitor 15 with a load applied to the core body 12 on an axis of abscissa, and a phase (a difference in phase between a transmitted electric wave and a received electric wave) on an axis of ordinate.

Although the variable capacitor 15 of the embodiment described above has a very simple construction, as shown in FIG. 7, the variable capacitor 15 can detect a load (pressure) of about 10 g. Also, the variable capacitor 15 can approximately linearly detect the applied load up to about 100 g with high sensitivity. The applied load above 100 g up to about 300 g can be suitably detected as well. Although a change in phase difference against the applied load of 300 g or more becomes small, since application of a large pen pressure of 300 g or more to the position indicator 2 is rare, practical utility of the position indicator 2 using the variable capacitor 15 is not compromised at all.

Figure 21A:
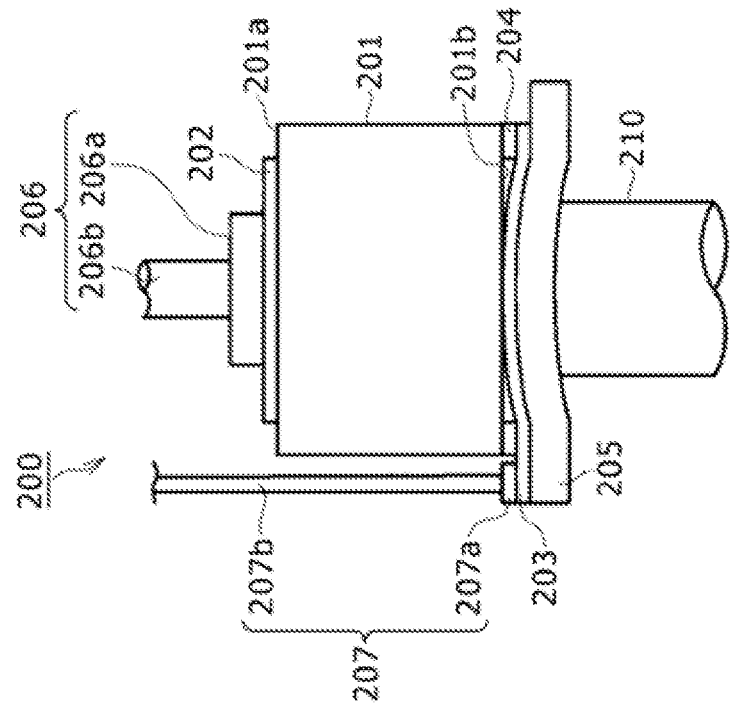
FIGS. 21A and 21B are an explanatory view schematically showing an initial state of a conventional variable capacitor, and an explanatory view showing a state in which a pressure (pen pressure) is applied to a core body of the conventional variable capacitor, respectively.
Figure 21B:
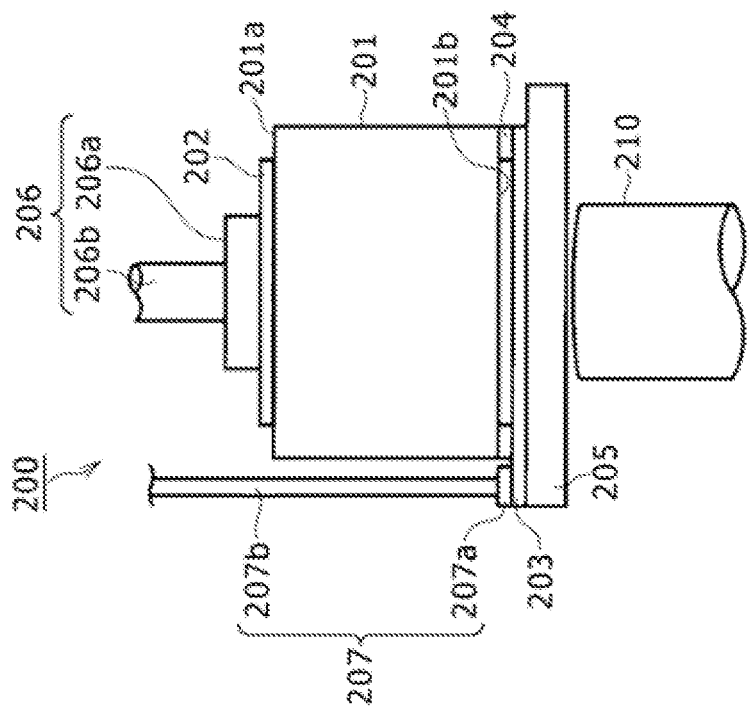
Figure 22:
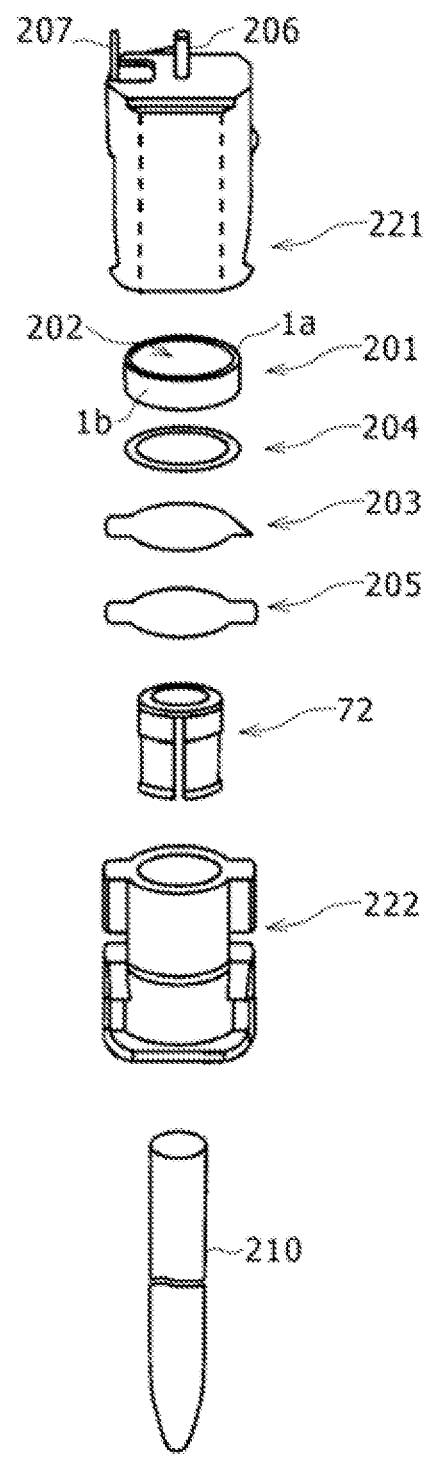
FIG. 22 is an exploded perspective view showing a concrete construction of the conventional variable capacitor shown in FIGS. 21A and 21B.

The phase-load characteristics of the variable capacitor 15 shown in FIG. 7 are approximately the same as the characteristics of the position indicator using the conventional variable capacitor described with reference to FIGS. 21A and 21B, and FIG. 22, for example. Therefore, although the variable capacitor 15 of the illustrated embodiment is simple in construction, the variable capacitor 15 maintains the same performance as compared with the conventional variable capacitor.

[Circuit Configuration of Position Detector 1]

Figure 8:
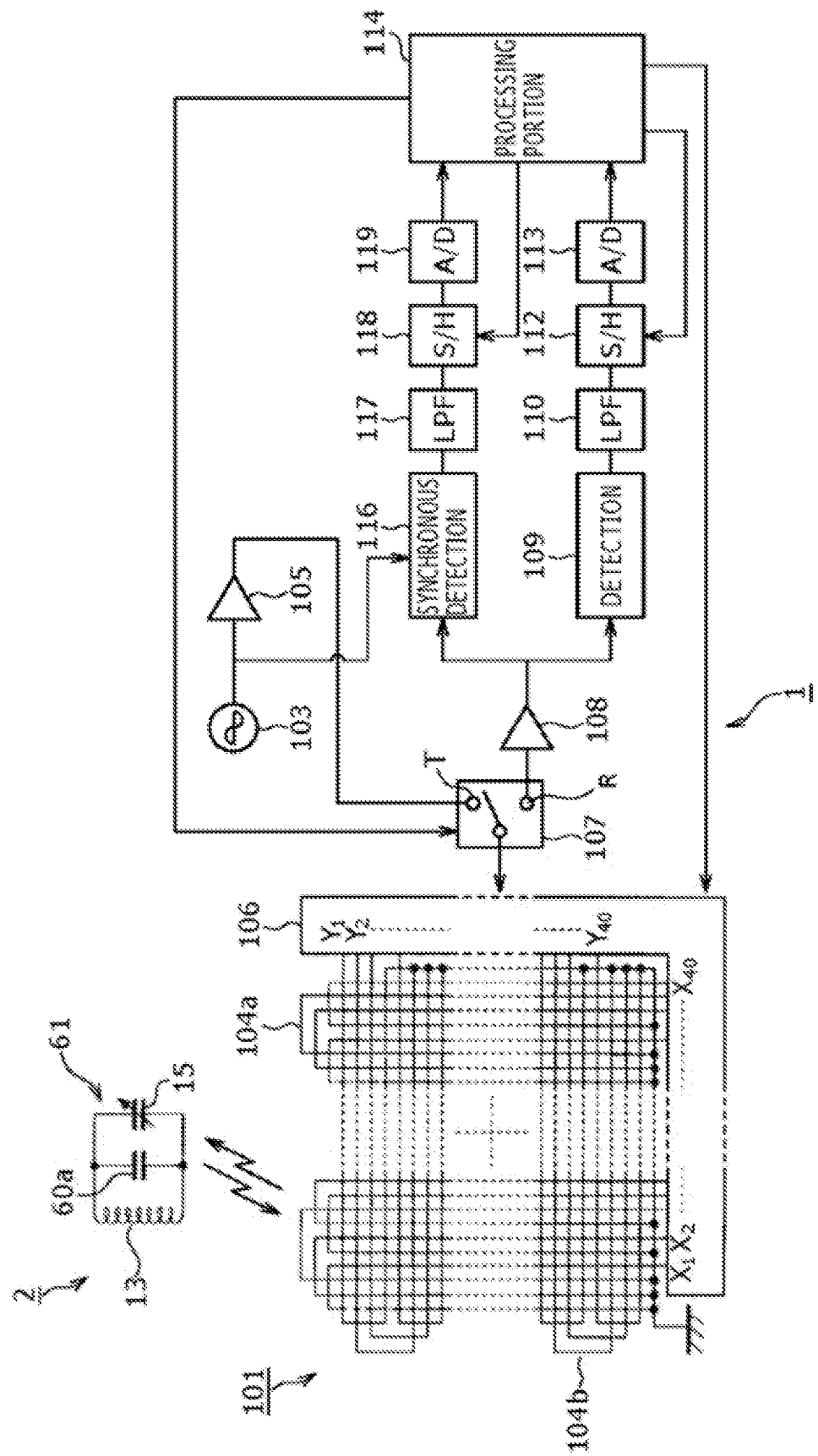
FIG. 8 is a block diagram, partly in circuit, showing a position indicator and a position detector composing the input device according to an embodiment of the present invention.

Next, a description will be given of a concrete circuit configuration of the position detector 1, for detecting the indicated position and the pen pressure, by using the position indicator 2 including the variable capacitor 15 described above with reference to FIG. 8. FIG. 8 is a block diagram, partly in circuit, showing the position indicator 2 and the position detector 1. The input device is composed of the position indicator 2 and the position detector 1.

The position indicator 2 is configured by a resonance circuit 61 composed of the position indicating coil 13, the variable capacitor 15 connected in parallel with the position indicating coil 13, and a resonance capacitor 60a connected in parallel with the variable capacitor 15 in terms of a circuit configuration. In various embodiments, the resonance circuit 61 changes its resonance frequency in accordance with a change in electrical capacitance of the variable capacitor 15, and the change in resonance frequency is detected as a pen pressure.

On the other hand, in the position detector 1, an X-axis direction loop coil group 104a, and a Y-axis direction loop coil group 104b are laminated and provided, thereby forming a position detecting coil 101. Each of the X-axis direction loop coil group 104a, and the Y-axis direction loop coil group 104b is composed of 40 rectangular loop coils, for example. The rectangular loop coils composing each of the X-axis direction loop coil group 104a and the Y-axis direction loop coil group 104b are disposed in such a way that they are arranged at equal intervals to be superposed one upon another.

The position detector 1 is provided with a selecting circuit 106, to which both of the X-axis direction loop coil group 104a and the Y-axis direction loop coil group 104b are connected. The selecting circuit 106 successively selects one loop coil from the X-axis direction loop coil group 104a and the Y-axis direction loop coil group 104b.

The position detector 1 is provided with an oscillator 103, a current driver 105, a switchover connecting circuit 107, a receiving amplifier 108, a detector 109, a low-pass filter 110, a sample-and-hold circuit 112, an A/D conversion circuit 113, a synchronous detector 116, a low-pass filter 117, a sample-and-hold circuit 118, an A/D conversion circuit 119, and a processing portion 114.

The oscillator 103 is one which generates an A.C. signal having a frequency, f0, and supplies the resulting A.C. signal to each of the current driver 105 and the synchronous detector 116. The current driver 105 converts the A.C. signal supplied thereto from the oscillator 103 into an A.C. current, and sends the resulting A.C. current to the switchover connecting circuit 107. The switchover connecting circuit 107 switches connection destinations (a transmission side terminal T and a reception side terminal R), to which the loop coil selected by the selecting circuit 106 is connected in accordance with the control made by the processing portion 114, which will be described later. Of the connection destinations, the current driver 105 is connected to the transmission side terminal T, and the reception amplifier 108 is connected to the reception side terminal R.

An induced voltage generated in the loop coil selected by the selecting circuit 106 is sent to the reception amplifier 108 through the selecting circuit 106 and the switchover connecting circuit 107. The reception amplifier 108 amplifies the induced voltage supplied thereto from the selected loop coil, and sends the induced voltage thus amplified to each of the detector 109 and the synchronous detector 116.

The detector 109 detects the induced voltage generated in the selected loop coil, that is, the received signal, and sends the received signal thus detected to the low-pass filter 110. The low-pass filter 110 has a sufficient lower cutoff frequency than the frequency, f0, described above, converts the output signal from the detector 109 into a D.C. signal, and sends the resulting D.C. signal to the sample-and-hold circuit 112. The sample-and-hold circuit 112 holds an analog voltage value at a predetermined timing of the output signal from the low-pass filter 110, specifically, at a predetermined timing during a period of time for reception, and sends the analog voltage to the Analog-to-Digital (A/D) conversion circuit 113. The A/D conversion circuit 113 converts the analog output from the sample-and-hold circuit 112 into a digital signal, and outputs the resulting digital signal to the processing portion 114.

On the other hand, the synchronous detector 116 detects the output signal from the reception amplifier 108 synchronously with the A.C. signal from the oscillator 103, and sends a signal having a level corresponding to a difference in phase between the output signal and the A.C. signal to the low-pass filter 117. The low-pass filter 117 has a sufficiently lower cutoff frequency than the frequency, f0, and converts the output signal from the synchronous detector 116 into a D.C. signal and sends the resulting D.C. signal to the sample-and-hold circuit 118. The sample-and-hold circuit 118 holds an analog voltage value at a predetermined timing of the output signal from the low-pass filter 117, and sends the analog voltage to the Analog-to-Digital (A/D) conversion circuit 119. The A/D conversion circuit 119 converts the analog voltage from the sample-and-hold circuit 118 into a digital signal, and outputs the resulting digital signal to the processing portion 114.

The processing portion 114 controls the operations of the portions in the position detector 1. In other words, the processing portion 114 controls the selection of the loop coil in the selecting circuit 106, the switchover of the switchover connecting circuit 107, and the timings of the sample-and-hold circuits 112 and 118. The processing portion 114 causes the X-axis direction loop group 104a and the Y-axis direction loop group 104b to transmit the electric wave for a given transmission duration in accordance with the input signals from the A/D conversion circuits 113 and 119.

The induced voltage is generated in each of the loop coils of the X-axis direction loop group 104a and the Y-axis direction loop group 104b based on the electric wave transmitted from the position indicator 2. The processing portion 114 calculates the coordinate values of the indicated position in the X-axis direction and in the Y-axis direction in accordance with the level of the voltage value of the induced voltage generated in corresponding one of the loop coils. In addition, the processing portion 114 detects the pen pressure in accordance with the difference in phase between the transmitted electric wave and the received electric wave.

Figure 9:
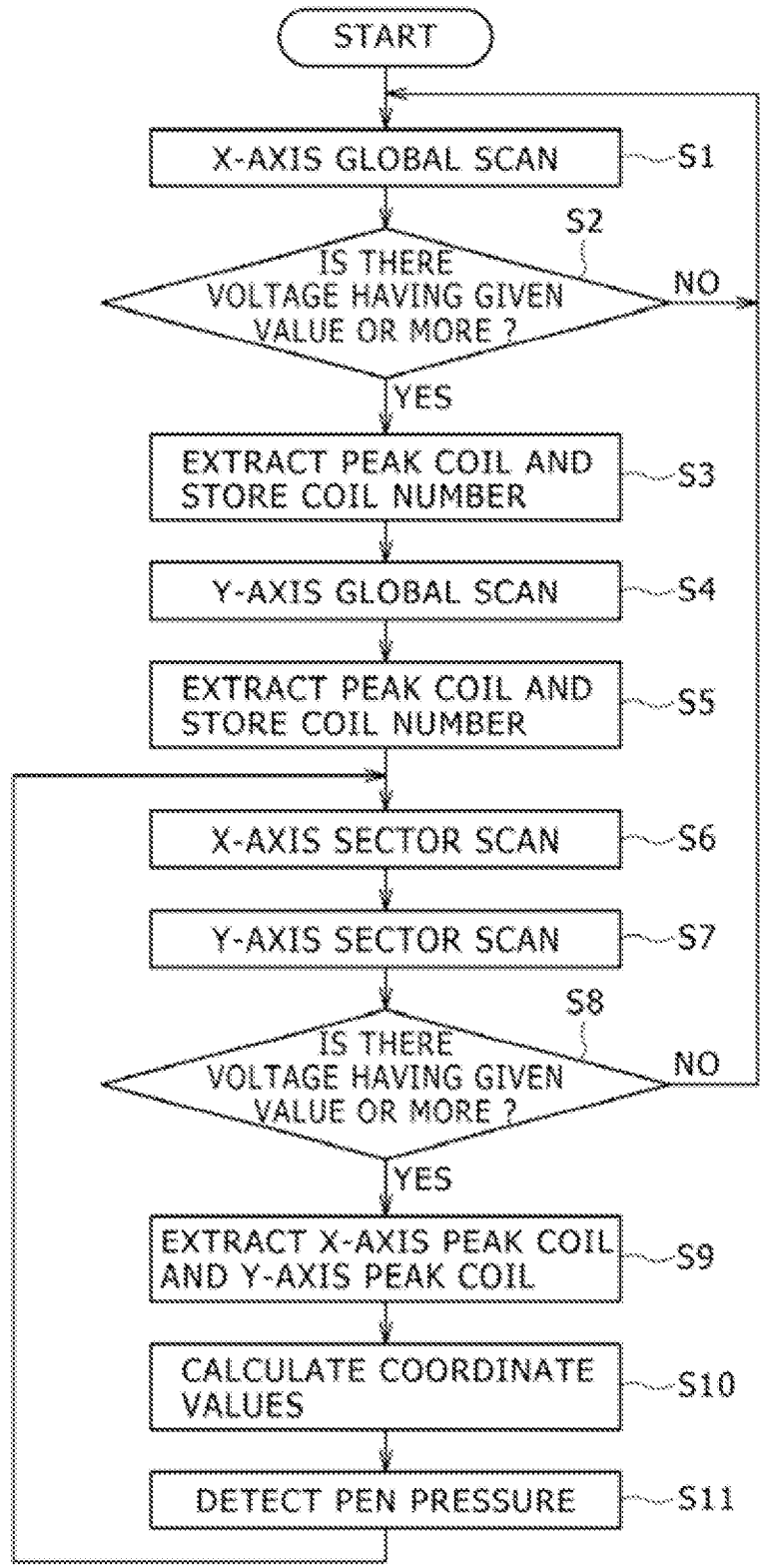
FIG. 9 is a flow chart showing processing executed by a processing portion of the position detector composing the input device according to an embodiment of the present invention.

Next, an operation of the position detector 1 carried out along a flow of processing in the processing portion 114 will be described with reference to FIG. 9. FIG. 9 is a flow chart representing the flow of the processing in the processing portion 114.

Firstly, the processing portion 114 successively scans and selects the loop coils of the X-axis direction loop group 104a (hereinafter, this successive scan and selection will be referred to as "global scan") (Step S1).

Concretely describing the global scan, the processing portion 114 firstly sends information, in accordance with which the first loop coil of the X-axis direction loop coil group 104a, for example the loop coil X1, is selected by the selecting circuit 106, and also sends a signal, in accordance with which the transmission side is selected by the switchover connecting circuit 107. As a result, a sine wave signal having the frequency f0 is supplied from the oscillator 103 to the loop coil X1, so that the loop coil X1 generates the electric wave having the frequency, f0. At this time, when the position indicator 2 either approaches or contacts the upper surface of the detecting portion 4 of the position detector 1, the electric wave generated from the loop coil X1 excites the resonance circuit 61 having the position indicating coil 13. As a result, the induced voltage having the frequency f0 is generated in the resonance circuit 61.

After the processing portion 114 sends a signal, in accordance with which the transmission side terminal T is selected by the switchover connecting circuit 107 for a given period of time, the processing portion 114 sends a signal, in accordance with which the reception side terminal R is selected by the switchover connecting circuit 107, thereby causing the electric wave generated from the loop coil X1 to disappear. In this case, the induced voltage generated in the resonance circuit 61 of the position indicator 2 having the resonance capacitor 60a and the variable capacitor 15 gradually attenuates correspondingly, so that the resonance circuit 61 transmits the electric wave. The electric wave reversely excites the loop coil X1 described above, thereby causing the loop coil X1 to generate the induced voltage.

After the processing portion 114 sends a signal, in accordance with which the reception side terminal R is selected by the switchover connecting circuit 107 for a given period of time, the processing portion 114 sends information, in accordance with which the selecting circuit 106 is caused to select the second loop coil from the X-axis direction loop group 104a, for example the loop coil X2, to be connected to the switchover connecting circuit 107. After that, the processing portion 114 sends a signal, in accordance with which the transmission side terminal T is selected by the switchover connecting circuit 107, thereby carrying out the same transmission and reception of the electric wave as those in the foregoing.

After that, the processing portion 114 executes the same processing as that of the foregoing, whereby the loop coils from the third to 40-th loop coils of the X-axis direction loop coil group 104a, for example the loop coils X3 to X40, are successively scanned and selected. As a result, the transmission and reception of the electric wave are carried out in the loop coils X3 to X40 in order.

It is noted that in the processing in Step S1, the processing portion 114 may suitably limit the loop coils to be selected such as every other loop coil or one in every two loop coils. In addition, the transmission and reception of the electric wave for one loop coil may be carried out plural times. Moreover, although the transmission time for each of the loop coils need to be the same, and the reception time for each of the loop coils need to be the same, the transmission time and the reception time need not be identical to each other.

The induced voltage generated in the loop coil of the X-axis direction loop coil group 104a for the period of time for reception described above, that is, the A.C. received signal, is detected by the detector 109 to be converted into a D.C. signal and smoothed in the low-pass filter 110. The resulting D.C. signal is held at the predetermined timing by the sample-and-hold circuit 112, and is then sent as a voltage value to the processing portion 114 through the A/D conversion circuit 113.

Figure 10:
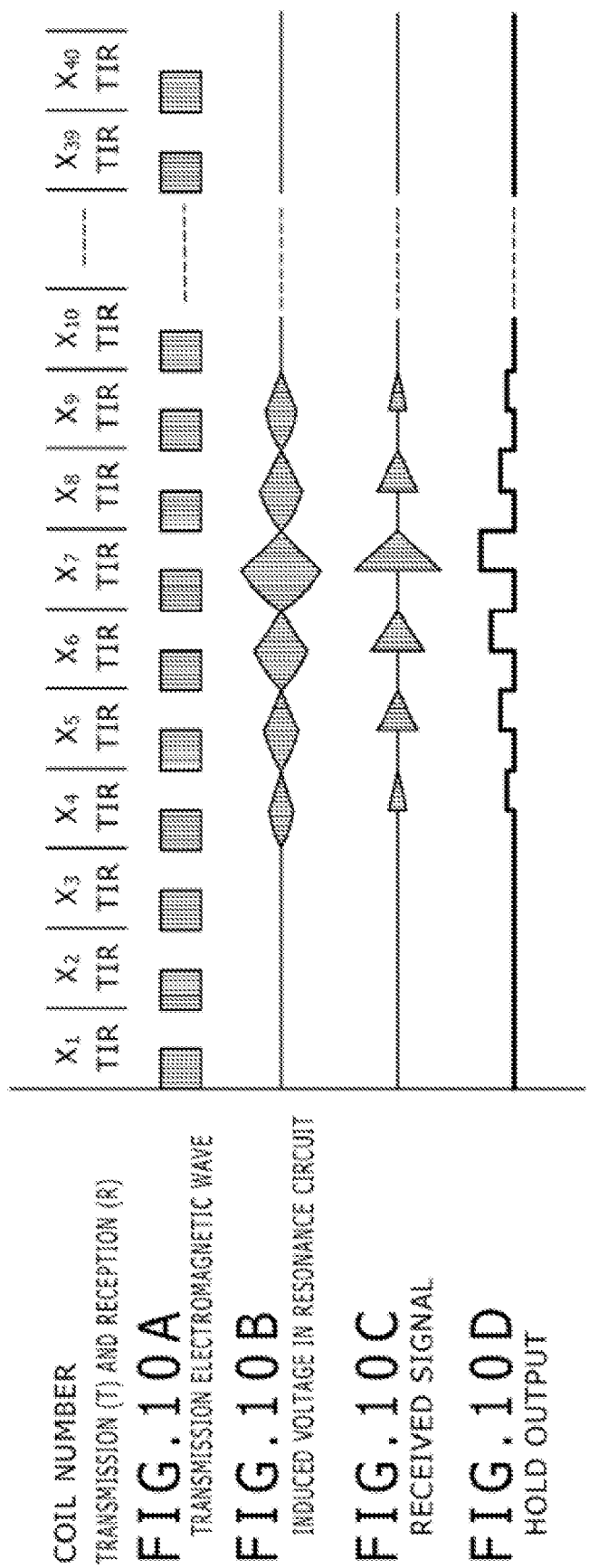
FIGS. 10A to 10D are waveform charts respectively showing waveforms obtained in different portions, in an X-axis global scanning operation carried out by the position detector composing the input device according to an embodiment of the present invention.
Figure 11:
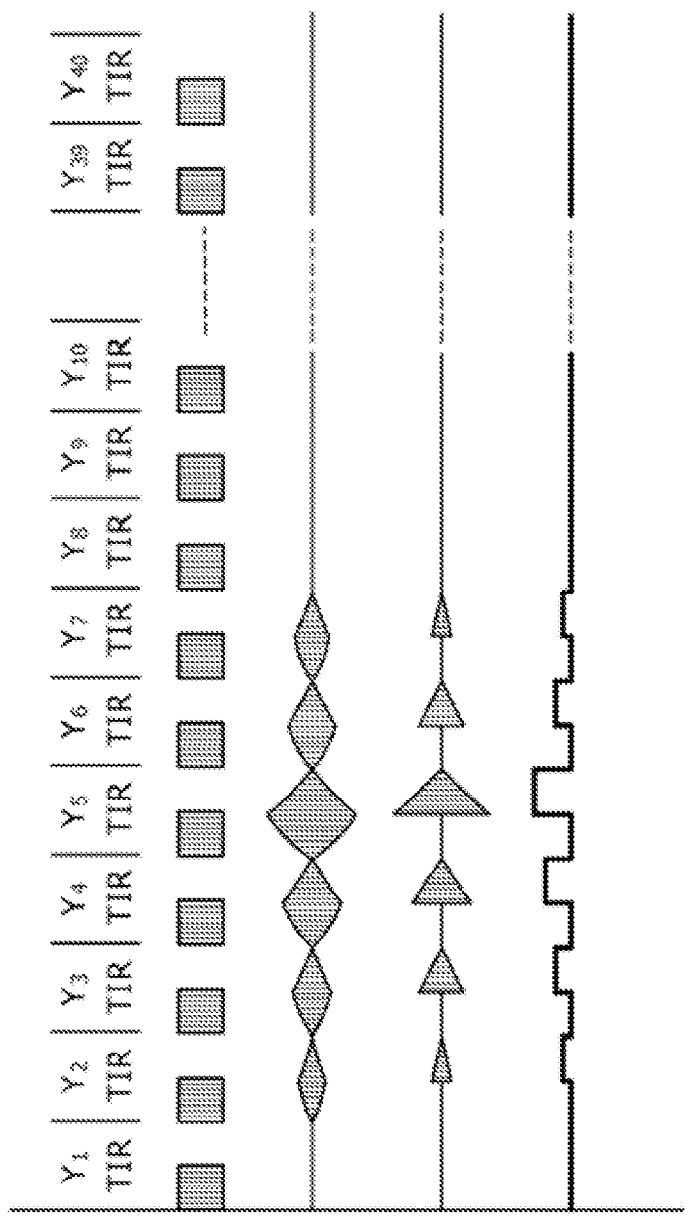
FIGS. 11A to 11D are waveform charts respectively showing waveforms obtained in different portions, in a Y-axis global scanning operation carried out by the position detector composing the input device according to an embodiment of the present invention.
Figure 12:
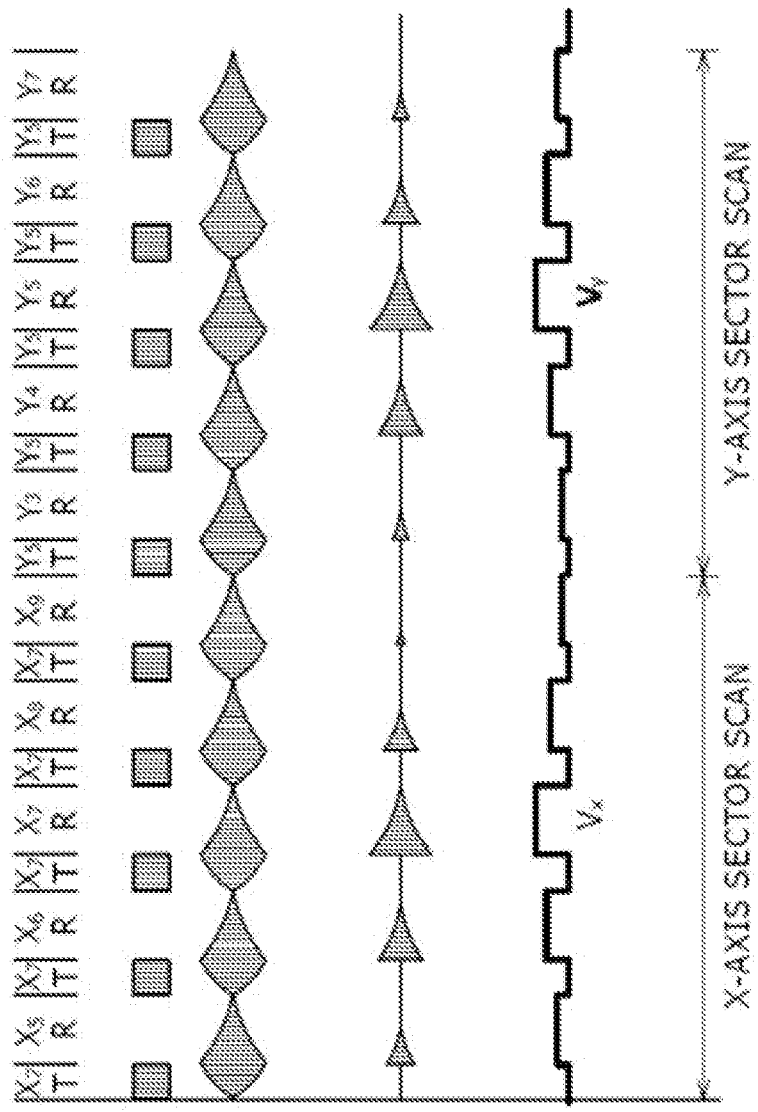
FIGS. 12A to 12D are waveform charts respectively showing waveforms obtained in different portions, in an X-axis sector scanning operation and a Y-axis sector scanning operation carried out by the position detector composing the input device according to an embodiment of the present invention.

FIGS. 10A to 10D show an example of waveforms in the portions in the X-axis global scanning operation (Step S1 in FIG. 9) described above. FIG. 10A shows the waveforms of the electric wave transmitted from the position detecting coil 101. FIG. 10B shows the waveforms of the induced voltage generated in the resonance circuit 61, FIG. 10C shows the waveforms of the received signal received by the position detector 1, and FIG. 10D shows the waveforms of the output signal from the sample-and-hold circuit 112.

Here, a level of the output signal from the sample-and-hold circuit 112 is a value depending on a distance between the position indicator 2 and the loop coil. For this reason, the processing portion 114 determines whether or not a maximum value of the level of the output signal from the sample-and-hold circuit 112 is equal to or larger than a given value previously set (Step S2), thereby determining whether or not a height of the position indicator 2 falls within an effective read height of the position detector 1.

When it is determined in the processing in Step S2 that the maximum value of the level of the output signal from the sample-and-hold circuit 112 is not equal to or larger than the given value previously set, that is, the height of the position indicator 2 does not fall within the effective read height of the position detector 1 (NO in Step S2), the processing portion 114 returns the operation back to the processing in Step S1.

On the other hand, when it is determined in the processing in Step S2 that the height of the position indicator 2 falls within the effective read height of the position detector 1 (YES in Step S2), the processing portion 114 extracts the loop coil from which the maximum value is obtained (hereinafter referred to as "a peak coil") from the loop coils X1 to X40, and stores a number of the peak coil ("X7" in this case) (Step S3).

Next, the processing portion 114 successively scans and selects (global scan) the loop coils of the Y-axis direction loop coil group 104b (Step S4), and carries out the transmission and reception of the electric waves in the loop coils of the Y-axis direction loop coil group 104b.

FIGS. 11A to 11D show an example of waveforms in the portions in a Y-axis global scanning operation. Here, the signals shown in waveforms in FIGS. 11A to 11D are the same signals as those shown in FIGS. 10A to 10D, respectively.

Next, the processing portion 114 extracts the loop coil from which the maximum value is obtained (hereinafter referred to as "a peak coil") of the loop coils Y1 to Y40, and stores a number of the peak coil ("Y5" in this case) (Step S5).

Next, the processing portion 114 carries out the transmission and reception of the electric waves for a predetermined number of X loop coils adjacent to the X peak coil, for example, five loop coils with the peak coil of the X-axis direction loop coil group 104a as a center. In the transmission and reception of each of the electric waves, when the electric wave is transmitted, that is, when the transmission side terminal T is selected in the switchover connecting circuit 107, the processing portion 114 usually selects the peak coil ("the loop coil X7" in this case). On the other hand, when the electric wave is received, that is, when the reception side terminal R is selected in the switchover connecting circuit 107, the processing portion 114 successively scans and selects (sector scan) the loop coils (the five loop coils in this case) in the ascending order in number (or in the descending order in number) (Step S6).

When the X-axis sector scanning operation has been ended, the processing portion 114 carries out the transmission and reception of the electric waves for a predetermined number of Y loop coils adjacent to the Y peak coil, for example, five loop coils with the peak coil of the Y-axis direction loop coil group 104a as a center. In the transmission and reception of each of the electric waves, when the electric wave is transmitted, that is, when the transmission side terminal T is selected in the switchover connecting circuit 107, the processing portion 114 usually selects the peak coil ("the loop coil Y5" in this case). On the other hand, when the electric wave is received, that is, when the reception side terminal R is selected in the switchover connecting circuit 107, the processing portion 114 successively scans and selects (sector scan) the loop coils (the five loop coils in this case) in the ascending order in number (or in the descending order in number) (Step S7).

FIGS. 12A to 12D show an example of waveforms in the portions in the X-axis sector scanning operation and the Y-axis sector scanning operation. Here, the signals shown in FIGS. 12A to 12D are the same signals as those shown in FIGS. 10A to 10D, respectively.

When the Y-axis sector scanning operation has been ended, the processing portion 114 determines whether or not each of maximum values of the induced voltages obtained in the two processing operations in Steps S6 and S7, respectively, is equal to or larger than a given value previously set (Step S8), thereby determining whether or not the height of the position indicator 2 falls within the effective read height of the position detector 1.

When it is determined in the processing in Step S8 that the maximum value of the level of the output signal from the sample-and-hold circuit 112 is not equal to or larger than the given value previously set, that is, the height of the position indicator 2 does not fall within the effective read height of the position detector 1 (NO in Step S8), the processing portion 114 returns the operation back to the processing in Step S1.

On the other hand, when it is determined in the processing that the height of the position indicator 2 falls within the effective read height of the position detector 1 (YES in Step S8), the processing portion 114 extracts the peak coil in the X-axis direction and the peak coil in the Y-axis direction from which the maximum induced voltages are obtained, respectively, and stores numbers of the respective peak coils (Step S9).

Next, the processing portion 114 extracts plural induced voltages, for example, three induced voltages in the descending order in level whenever the X-axis direction sector scan and the Y-axis direction sector scan are carried out, thereby obtaining the coordinate values in the X-axis direction and in the Y-axis direction of the position indicated by the position indicator 2 in accordance with these signals (Step S10). The coordinate values in the X-axis direction and in the Y-axis direction can be calculated by carrying out the well-known coordinate calculation, as described in Japanese Patent No. 2,131,145 commonly assigned as the present application.

Next, the processing portion 114 detects the pen pressure from the level of the signal corresponding to the difference in phase between the transmitted electric wave and the received electric wave (Step S11). Hereinafter, the processing portion 114 repetitively executes the six processing operations in Steps S6 to S11 as long as the height of the position indicator 2 falls within the effective read height. On the other hand, if it is determined that the height of the position indicator 2 does not fall within the effective read height, the processing portion 114 returns the operation back to the processing in Step S1.

This way, with the position detector 1, the position of the position indicator 2 approaching the position detector 1 can be detected by the processing portion 114. In addition, the phase of the signal received is detected, thereby making it possible to obtain the information on the value of the pen pressure of the position indicator 2.

[Another Configurations of Position Indicator 2]

Figure 13:
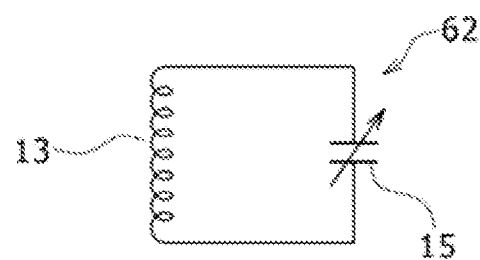
FIG. 13 is a circuit diagram showing another configuration of a resonance circuit provided in the position detector composing the input device according to an embodiment of the present invention.

Next, a description will be given with respect to another configuration of the position indicator 2 using the variable capacitor 15 of the embodiment described above according to the present invention. FIG. 13 is a circuit diagram showing another configuration (second configuration) of the resonance circuit provided in the position indicator 2. The resonance circuit 62 having this configuration is composed of the position indicating coil 13 and the variable capacitor 15. In the resonance circuit 61 having the first configuration (refer to FIG. 8), the variable capacitor 15 and the resonance capacitor 60a are connected in parallel with each other, thereby configuring the parallel resonance circuit. However, the resonance circuit of the position indicator 2, as shown in FIG. 13, can also be configured by using the variable capacitor 15 as the capacitor.

Figure 14:
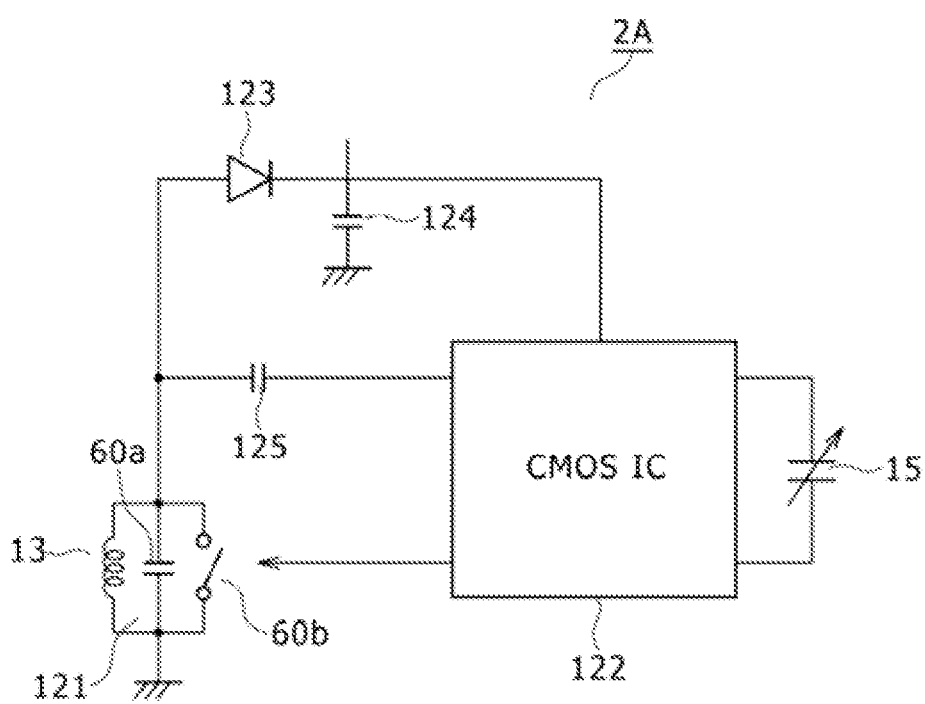
FIG. 14 is a circuit diagram showing another configuration of the position detector composing the input device according to an embodiment of the present invention.

Next, another configuration of a position indicator will be described with reference to FIG. 14. FIG. 14 is a circuit diagram showing another configuration of a position indicator 2A. It is noted that in a description which will be given with reference to FIG. 14, portions corresponding to those shown in FIG. 8 are designated by the same reference numerals or symbols, respectively, and a detailed description is omitted here for the sake of simplicity.

The position indicator 2A includes a resonance circuit 121 which resonates with the electric wave having the frequency, f0, and sent from the position detecting coil 101 (refer to FIG. 8) provided in the position detector 1. The resonance circuit 121 is composed of the position indicating coil 13 and the resonance capacitor 60a. In addition, an Integrated Circuit (IC) 122 manufactured by using the well-known Complementary Metal Oxide Semiconductor (CMOS) is disposed on a printed circuit board of the position indicator 2A. The CMOS IC 122 is driven by a drive power source composed of a diode 123 and a capacitor 124.

An anode terminal of the diode 123 is connected to the resonance circuit 121. An A.C. voltage which is generated in the resonance circuit 121 in accordance with an excitation signal supplied from the position detecting coil 101 is applied to the diode 123. The A.C. voltage is smoothed by both of the diode 123 and the capacitor 124 and is converted into a D.C. voltage to be used as a drive power source of the CMOS IC 122. In addition, a signal generated in the resonance circuit 121 is supplied to the CMOS IC 122 as well through the capacitor 125. The CMOS IC 122 generates both of a clock signal, synchronously with which the transmission and reception of the signal are carried out between the position indicator 2A and the position detector 1, and a clock signal, synchronously with which the pen pressure is detected in accordance with a signal supplied thereto through the capacitor 125.

As described above, the electrical capacitance of the variable capacitor 15 is changed in accordance with the pen pressure applied to the core body 12 of the position detector 2 (refer to FIG. 2). The variable capacitor 15 is connected to a resistor (not shown), thereby configuring a time constant circuit. Therefore, when the electrical capacitance of the variable capacitor 15 is changed in accordance with the pen pressure, a time constant of the time constant circuit is changed accordingly. The time constant is converted into a pen pressure value having a predetermined number of bits, for example, 8 bits in the CMOS IC 122.

The pen pressure data (8-bit pen pressure value) obtained in such a way is outputted 1 bit by 1 bit from the CMOS IC 122 synchronously with the above clock signal, synchronously with which the transmission and reception of the signal between the position detector 1 and the position indicator 2A are carried out. The CMOS IC 122 controls the switching between an ON state and an OFF state of the switch 60b connected in parallel with the resonance circuit 121 in accordance with the pen pressure data thus outputted. Therefore, when the switch 60b is held in the OFF state, the position detector 1 detects the signal sent thereto from the position indicator 2A. On the other hand, when the switch 60b is held in the ON state, since the resonance circuit 121 is short-circuited, the signal sent from the position indicator 2A cannot be detected by the position detector 1.

As a result, the position detector 1 transmits the excitation signal in accordance with which the electric power is supplied from the position detecting coil 101 to the position indicator 2A for a given period of time. After that, the position detector 1 detects the signal sent thereto from the position indicator 2A, thereby making it possible to obtain the pen pressure applied to the core body 12.

[Other Constructions of Variable Capacitor 15]

Figure 15A:
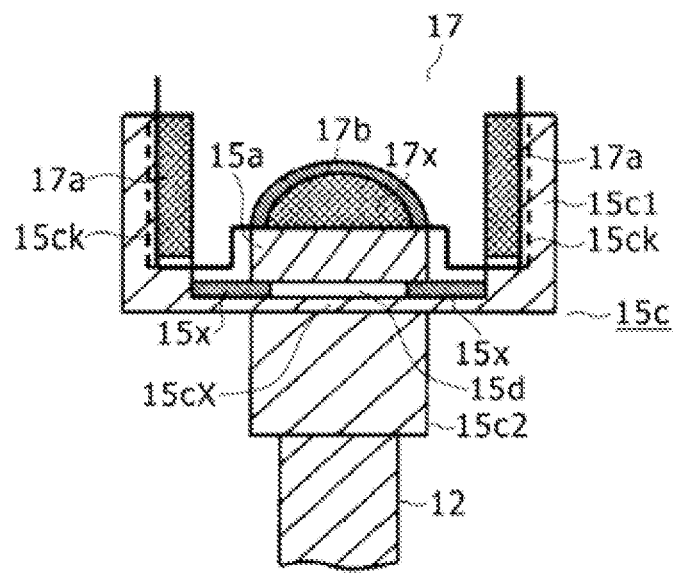
FIGS. 15A and 15B are a cross sectional view showing another construction of the variable capacitor, and a top plan view showing a construction of a conductive elastic portion shown in FIG. 15A, respectively.
Figure 15B:
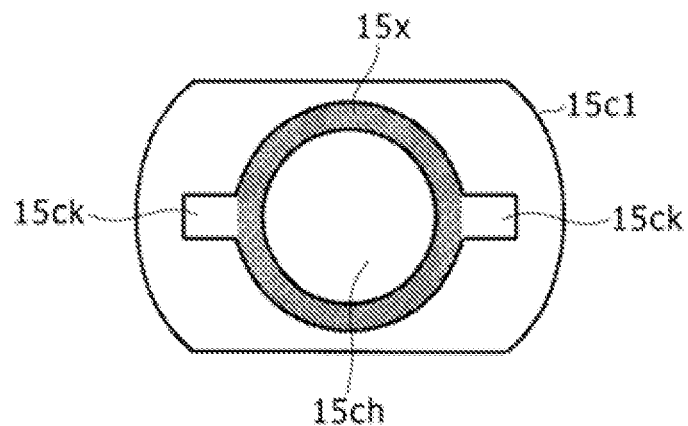
Figure 16:
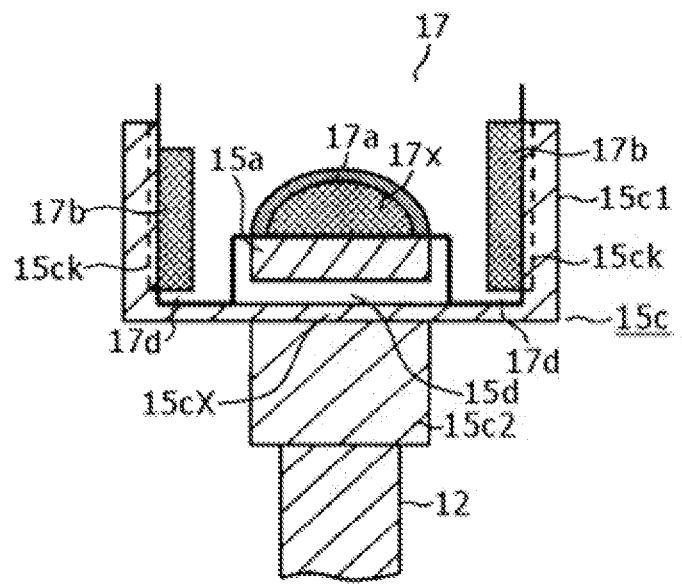
FIG. 16 is a cross sectional view showing still another construction of the variable capacitor.
Figure 17:
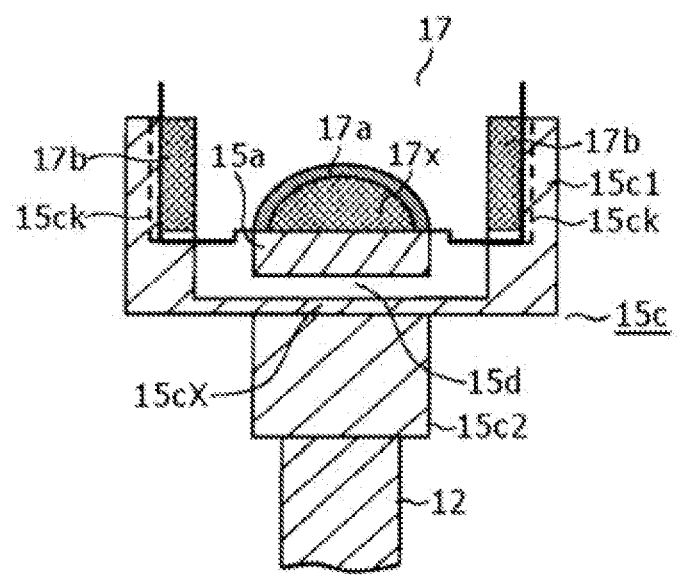
FIG. 17 is a cross sectional view showing yet another construction of the variable capacitor.

Next, other constructions of the variable capacitor 15 will be described with reference to FIGS. 15A and 15B to FIG. 17. FIGS. 15A and 15B are respectively a cross sectional view showing another construction of the variable capacitor 15, and a top plan view showing a construction of the conductive electric portion 15c of the variable capacitor 15 shown in FIG. 15A. FIG. 16 is a cross sectional view showing still another construction of the variable capacitor 15. Also, FIG. 17 is a cross sectional view showing yet another construction of the variable capacitor 15. The variable capacitor 15 in the embodiment of the input device described above is described as being composed of the dielectric 15a, the ring-like spacer 15b, and the conductive elastic member 15c. However, the construction can be further simplified so as not to require the ring-like spacer 15b in the variable capacitor 15. It is noted that in FIGS. 15A and 15B to FIG. 17, portions having the same constructions as those of the variable capacitor 15 described mainly with reference to FIG. 3 to FIGS. 6A and 6B are designated by the same reference numerals or symbols, respectively, and detailed descriptions thereof are omitted here for the sake of simplicity.

A variable capacitor 15(1) shown in FIGS. 15A and 15B is such that an insulator portion 15x is provided on the bottom surface of the holding hole 15ch for a board and the like of the holder portion 15c1 for a board and the like instead of the ring-like spacer 15b. In other words, as shown in the top plan view of the conductive elastic member 15c of FIG. 15B, the insulator portion 15x is provided in a portion, indicated by slant lines, of the bottom surface of the holding hole 15ch for a board and the like.

Any of various kinds of insulators may be provided in the portion, indicated by the slant lines, of the bottom surface of the holding hole 15ch for a board and the like by carrying out evaporation, fusion, application or the like, or plural protrusions made of any suitable insulator may be provided in the portion, indicated by the slant lines, of the bottom surface of the holding hole 15ch for a board and the like, thereby making it possible to form the insulator portion 15x. The insulator portion 15x is formed on the bottom surface of the holding hole 15ch for a board and the like of the holder portion 15c1 for a board and the like in such a way, which makes it unnecessary to accommodate the spacer 15b in the holding hole 15ch for a board and the like.

A variable capacitor 15(2) shown in FIG. 16 is such that both of the lateral side portions 17d of the printed wiring board 17 are formed so as to protrude (downwardly in FIG. 16) relative to the dielectric 15a, which is firmly fixed to the bottom side portion of the printed wiring board 17 (via the solder 17x). As a result, the dielectric 15a firmly fixed to the bottom side portion of the printed wiring board 17 is spaced (above) from the bottom surface (the dielectric contacting portion 15cX) of the holding hole 15ch for a board and the like by both of the lateral side portions 17c of the printed wiring board 17. In other words, the space 15d can be provided between the second surface portion 15a2 of the dielectric 15a and the dielectric contacting portion 15cX.

In a variable capacitor 15(3) shown in FIG. 17, both of the printed wiring board 17 and the dielectric 15a are formed so as to have the same constructions as those of the corresponding portions of the embodiment described with reference to FIGS. 6A and 6B, and the like. However, the holding hole 15ch for a board and the like is formed so as to be different in shape from the corresponding portion of the embodiment described with reference to FIGS. 6A and 6B, and the like. Specifically, as shown in FIG. 17, each of the groove portions 15ck into which the printed wiring board 17 is fitted is made shallow. As a result, the dielectric 15a firmly fixed to the printed wiring board 17 is spaced (above) from the bottom surface (the dielectric contacting portion 15cX) of the holding hole 15ch for a board and the like. In other words, the space 15d can be provided between the second surface portion 15a2 of the dielectric 15a and the dielectric contacting portion 15cX.

As shown in FIGS. 16 and 17, the second surface portion 15a2 of the dielectric 1a and the bottom surface (the dielectric contacting portion 15cX) of the holding hole 15ch for a board and the like are spaced from each other to provide the space 15d, thereby making it possible to make the use of the spacer 15b unnecessary.

However, to ensure that the second surface portion 15a2 of the dielectric 15a and the bottom surface (the dielectric contacting portion 15cX) of the holding hole 15ch for a board and the like come in contact with each other uniformly in accordance with the depressing force applied to the core body 12, it is preferable either to use the spacer 15b or to provide the insulator portion 15x. That is, it is preferable to construct the variable capacitor either like the variable capacitor 15 described with reference to FIG. 3 to FIGS. 6A and 6B, or like the variable capacitor 15(1) described with reference to FIGS. 15A and 15B.

It is noted that the portion of the printed wiring board 17 connected to the conductive elastic member 15c need not be constructed in the form of one sheet of board, but, for example, may be constructed as a combination of multiple boards that are crossed, thereby making it possible to provide the same state as that in the case where the spacer 15b is provided.

[Other Constructions of Conductive Elastic Member 15c]

Figure 18A:
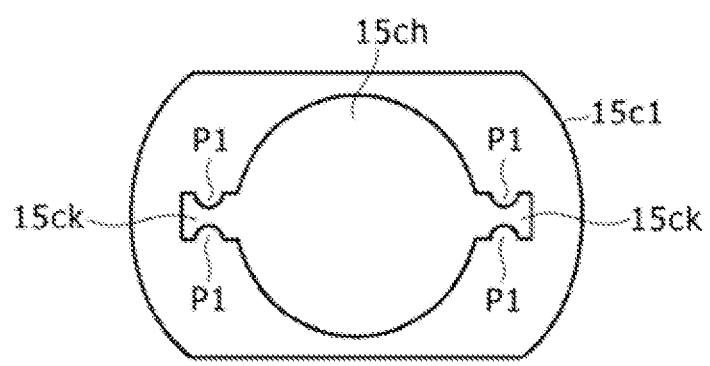
FIGS. 18A and 18B are a top plan view and a bottom plan view, respectively, each showing another construction of the conductive elastic member.
Figure 18B:
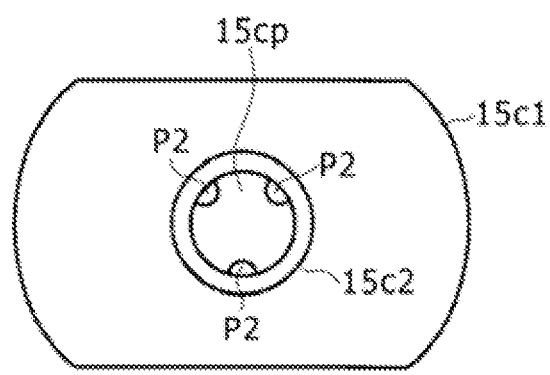
Figure 19A:
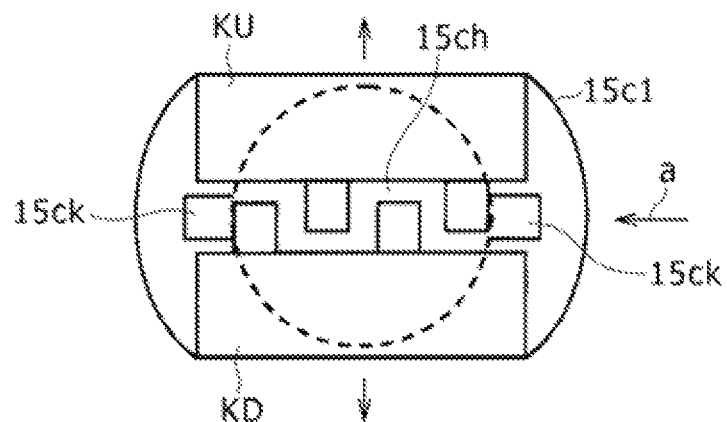
FIGS. 19A and 19B are a top plan view and a transverse cross sectional view, respectively, showing still another construction of the conductive elastic member.
Figure 19B:
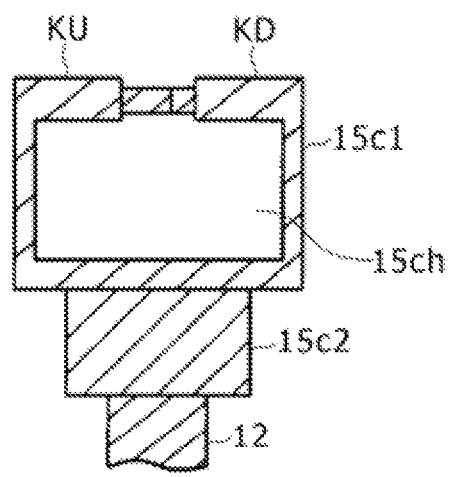

In addition, the conductive elastic member 15c is also by no means limited to the member described above, and thus the conductive elastic member 15c can be variously improved. FIGS. 18A and 18B are a top plan view and a bottom plan view, respectively, each showing another construction of the conductive elastic member 15c. FIGS. 19A and 19B are a top plan view and a transverse cross sectional view, respectively, each showing still another construction of the conductive elastic member 15c. It is noted that in FIGS. 18A and 18B and FIGS. 19A and 19B, portions which have the same constructions as those in the case of the variable capacitor 15 mainly described with reference FIG. 3 to FIGS. 6A and 6B are designated by the same reference numerals or symbols, respectively, and thus detailed descriptions thereof are omitted here for the sake of simplicity.

A conductive elastic material 15c(1) shown in FIGS. 18A and 18B is basically formed in the same manner as that in the case of the conductive elastic material 15c described with reference to FIGS. 4A and 4B. However, each of the groove portions 15ck provided in positions facing each other of the outer periphery of the holding hole 15ch for a board and the like of the holder portion 15c1 for a board and the like is different in shape from that shown in FIG. 4A. In addition, the core body holding hole 15cp of the core body holder portion 15c2 is also different in shape from that shown in FIG. 4B.

Specifically, as shown in the top plan view of the conductive elastic member 15c(1) of FIG. 18A, paired protrusions P1 are provided in respective positions facing each other in each of the groove portions 15ck provided in the respective positions facing each other of the paired outer periphery of the holding hole 15ch for a board and the like. Each of the protrusions P1 is formed in rod-like shape so as to extend from the upper end to the lower end of the groove portion 15ck.

A pair of protrusions P1 is provided such that, when the portions of the printed wiring board 17 having the second lead pieces 17b are inserted into the groove portions 15ck, respectively, each of the second lead piece 17b portions can be more firmly held between the paired protrusions P1. Therefore, the second lead pieces 17b and the conductive elastic member 15c(1) can be electrically connected more relatively. In addition, the printed wiring board 17 mounted to the conductive elastic member 15c(1) can be prevented from being detached from the conductive elastic member 15c(1).

In addition, as shown in the bottom plan view of the conductive elastic member 15c(1) of FIG. 18B, the core body holding hole 15cp is not provided with any of the slit portions 15cs, and instead, three protrusions P2 are provided inside the core body holding hole 15cp. Each of the three protrusions P2 is formed in rod-like shape so as to extend from the upper end to the lower end of the core body holding hole 15cp.

The three protrusions P2 are provided such that the core body 12 inserted into the core body holding hole 15cp can be more firmly held by the three protrusions P2, and the core body 12 can be reliably held by the core body holding hole 15cp. In other words, the core body 12 can be prevented from being detached from the core body holding hole 15cp.

A conductive elastic member 15c(2) shown in FIGS. 19A and 19B is composed of the holder portion 15c1 for a board and the like, and the core body holder portion 15c2 similarly to the case of the conductive elastic member 15c described above with reference to FIGS. 4A and 4B. In the conductive elastic member 15c(2) shown in FIGS. 19A and 19B, similarly to the case of the conductive elastic member 15c described above with reference to FIGS. 4A and 4B, the holder portion 15c1 for a board and the like is provided with the holding hole 15ch for a board and the like, and the core body holder portion 15c2 is provided with the core body holding hole 15cp.

However, in the conductive elastic member 15c(2) shown in FIGS. 19A and 19B, as shown in the top plan view of FIG. 19A, an opening portion of the holding hole 15ch for a board and the like is provided with a saw-tooth stopper, and is also provided with cover portions KU and KD for holding the printed wiring board 17 inserted thereinto between them. FIG. 19B is a cross sectional view of the conductive elastic member 15c(2) when viewed in the direction of an arrow "a" in FIG. 19A. As shown in FIG. 19B, the holding hole 15ch for a board and the like is provided inside the holder portion 15c1 for a board and the like. However, a construction is adopted such that the cover portions KU and KD are provided in the upper portion of the holder portion 15c1 for a board and the like so as to close the opening portion of the holding hole 15ch for a board and the like.

When the printed wiring board 17, to which both of the spacer 15b and the dielectric 15a are firmly fixed, is intended to be accommodated in the holding hole 15ch for a board and the like of the conductive elastic member 15c(2) in this case, as indicated by the two arrows shown in FIG. 19A, the cover portions KU and KD are pushed open to expose the opening portion of the holding hole 15ch for a board and the like. After the printed wiring board 17, to which both of the spacer 15b and the dielectric 15a were firmly fixed, has been accommodated in the holding hole 15ch for a board and the like, the cover portions KU and KD are closed. As a result, the printed wiring board 17 thus accommodated is held by the saw-tooth stopper of the cover portions KU and KD, thereby making it possible to prevent the printed wiring board 17 from being detached from the conductive elastic member 15c(2).

[Another Construction of Core Body Holder Portion 15c2]

Figure 20:
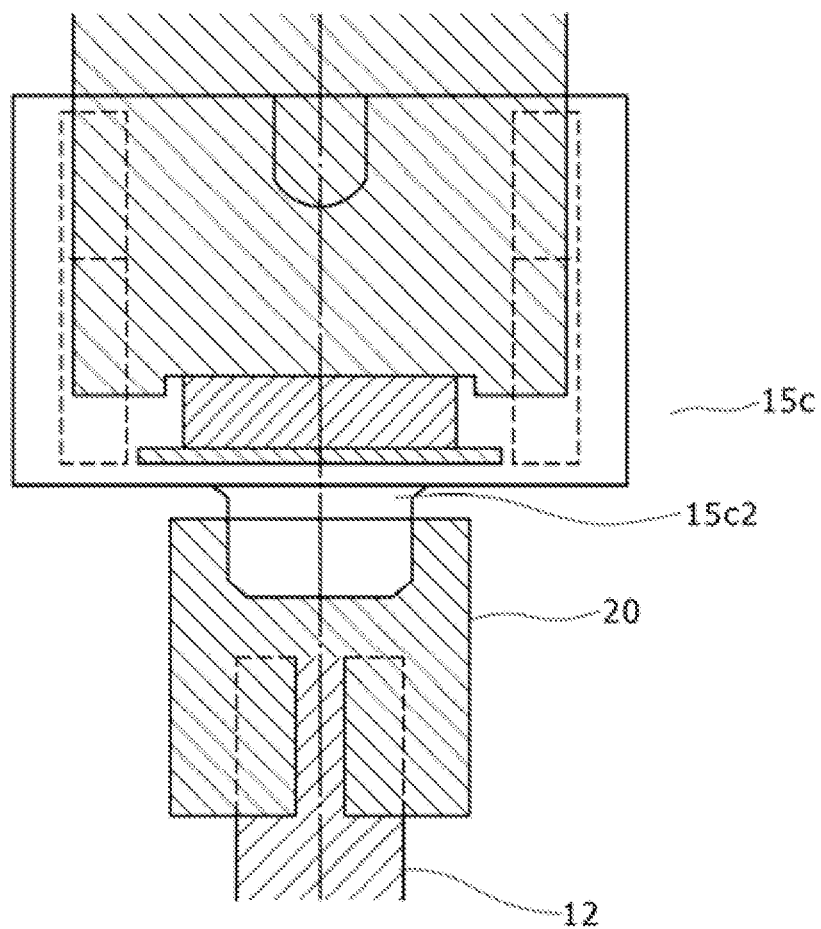
FIG. 20 is a cross sectional view showing another construction of a core body holder portion.

Next, another construction of the core body holder portion 15c2 will be described with reference to FIG. 20. FIG. 20 is a cross sectional view showing the other construction of the core body holder portion 15c2. The core body holder portion 15c2 of the embodiment described above has the cylindrical core body holding portion 15cp (refer to FIG. 3) in order to insert and hold the axis portion 12b of the core body 12 into the core body holder portion 15c2. In this embodiment, when the pen drops with the pen tip down, the core body holder portion 15c2 may be damaged due to the shock in some cases. In order to address this situation, in the other construction of the core body holder portion 15c2 shown in FIG. 20, for the purpose of softening the shock caused by dropping of the pen to thereby prevent damage to the core body holder portion 15c2, a connection cap 20 is provided between the axis portion 12b of the core body 12 and the core body holder portion 15c2. Additional provision of the connection cap 20 results in that the core body holder portion 15c2 can be prevented from being damaged by the shock caused by dropping of the pen.

Effects of the Embodiments

As set forth hereinabove, according to various embodiments of the present invention, the variable capacitor 15 having the performance equal to that of the conventional variable capacitor can be realized by provision of the dielectric 15a, the spacer 15b, and the conductive elastic member 15c. In addition, it is also possible to construct the variable capacitors 15(1), 15(2), 15(3), etc. each not using the spacer 15b.

As a result, it is possible to realize a variable capacitor with a dramatically reduced number of parts or components, as compared with the case of the conventional variable capacitor. Therefore, it is possible to realize a variable capacitor, which has a reduced number of parts or components and which can be very simply manufactured. These effects make it possible to largely reduce the cost of the variable capacitor. It is also possible to realize a position indicator using the variable capacitor, and an input device using the position indicator, which are further useful in reducing the cost of the position indicator and the input device.

[Others]

Although in the embodiments described above, the conductive elastic member 15c has been described as including both of the holder portion 15c1 for a board and the like, and the core body holder portion 15c2, the present invention is by no means limited thereto. For example, when the core body 12 is held movably in the axis direction within the first case 18 as shown in FIG. 2 by a mechanism provided in the first case 18 side, which ensures that the predetermined position of the conductive elastic member 15c is depressed by the core body 12, it is unnecessary to provide the core body holder portion 15c2.

In addition, as also described above, the shape of the holding hole 15ch for a board and the like of the holder portion 15c1 for a board and the like can be variously changed. For example, the dielectric 15a can be formed in a polygonal columnar shape such as a quadrangular columnar shape, and the spacer 15b can also be formed in a polygonal columnar shape such as a quadrangular columnar shape so as to correspond to the shape of the dielectric 15a. In this case, the holding hole 15ch for a board and the like of the holder portion 15c1 for a board and the like has a polygonal opening portion, which agrees in shape with the shape of the dielectric 15a or the spacer 15b.

In addition, it is also expected to adopt a construction in which the holding hole 15ch for a board and the like is not provided. In short, it is only necessary that the variable capacitor 15 is constructed such that the second lead piece 17b of the printed wiring board 17 is normally in contact with the conductive elastic member 15c, while only when the core body 12 is depressed the dielectric contacting portion 15cX (of the conductive elastic member 15c) comes in contact with the second surface portion 15a2 of the dielectric 15a connected to the first lead piece 17a of the printed wiring board 17.

It is also possible to adopt a configuration such that, in the position indicator 2, another construction having the variable capacitor 15 is provided on a side opposite to the side where the core body 12 is provided, such that two core bodies 12 each coupled with a variable capacitor 15 of the present invention are provided in mirror image. Then, either end of the position indicator 2 can be used as an input end of the position indicator. In addition, it is also possible to adopt a similar configuration having two variable capacitors 15 arranged on both sides of the position indicator 2 in mirror image, with one side being provided with the core body 12 to be used as an input end of information, while the other side being used as a so-called "rubber" eraser for erasing the inputted information.

It should be understood by those skilled in the art that various modifications, combinations, sub-combinations and alterations may occur depending on design requirements and other factors insofar as they are within the scope of the appended claims or the equivalents thereof.

What is claimed is:

1. A variable capacitor for use in conjunction with an electronic circuit board including a first terminal portion and a second terminal portion, said variable capacitor comprising:
   a dielectric having a first surface portion and a second surface portion opposite to said first surface portion; and
   a conductive elastic member shaped as an enclosure defined by a bottom surface and a wall surface intersecting said bottom surface to enclose said dielectric, the enclosure forming a board coupling portion to receive at least a portion of the electronic circuit board therein, and the bottom surface of the enclosure forming a dielectric contacting portion,
   wherein said first terminal portion is coupled to said first surface portion, said second terminal portion is coupled to said board coupling portion, and said dielectric contacting portion is disposed separately from said second surface portion so as to face said second surface portion and is configured to be deformed to come in contact with said second surface portion, and
   a contact area between said second surface portion and said dielectric contacting portion is changed in correspondence to a depressing force, which is applied against said dielectric contacting portion in a direction toward the dielectric, thereby changing an electrostatic capacitance of the variable capacitor.

2. The variable capacitor according to claim 1, further comprising a spacer configured to provide a space between said second surface portion and said dielectric contacting portion when the depressing force is not applied.

3. The variable capacitor according to claim 2, wherein said enclosure is configured to further receive therein said spacer.

4. The variable capacitor according to claim 3, wherein a distance from a center to an outer periphery of said spacer is longer than a distance from a center to an outer periphery of said second surface portion, and is shorter than a distance from a center to an outer periphery of said enclosure.

5. The variable capacitor according to claim 1, wherein said electronic circuit board includes a cutout portion adjacent to said first terminal portion, and
   wherein said cutout portion is fixed to said dielectric with a conductive adhesive.

6. The variable capacitor according to claim 1, wherein the board coupling portion of said conductive elastic member comprises a groove defined on the wall surface of the enclosure to receive the portion of the electronic circuit board therein.

7. The variable capacitor according to claim 1, wherein said enclosure is further configured to provide a space between said second surface portion of the dielectric and said dielectric contacting portion provided by the bottom surface of the enclosure when the depressing force is not applied.

8. The variable capacitor according to claim 7, further comprising an annular insulator portion applied on the bottom surface of the enclosure.

9. The variable capacitor according to claim 1, wherein said first surface portion of the dielectric is coupled to said first terminal portion that is in a flat shape.

10. The variable capacitor according to claim 1, wherein said first surface portion of the dielectric is coupled to said first terminal portion that is in a curved semi-spherical shape.

11. The variable capacitor according to claim 10, wherein said first surface portion of the dielectric is coupled to said first terminal portion via a solder material.

12. A position indicator, comprising:
- an electronic circuit board including a first terminal portion and a second terminal portion,
- a variable capacitor used in conjunction with the electronic circuit board, said variable capacitor including:
  - a dielectric having a first surface portion and a second surface portion opposite to said first surface portion, and
  - a conductive elastic member shaped as an enclosure defined by a bottom surface and a wall surface intersecting said bottom surface to enclose said dielectric, the enclosure forming a board coupling portion to receive at least a portion of the electronic circuit board therein, and the bottom surface of the enclosure forming a dielectric contacting portion,
  - wherein said first terminal portion is coupled to said first surface portion, said second terminal portion is coupled to said board coupling portion, and said dielectric contacting portion is disposed separately from said second surface portion so as to face said second surface portion and is configured to be deformed to come in contact with said second surface portion, and
  - a contact area between said second surface portion and said dielectric contacting portion is changed in correspondence to a depressing force, which is applied against said dielectric contacting portion in a direction toward the dielectric, thereby changing an electrostatic capacitance of the variable capacitor; and
- a resonance circuit having said variable capacitor.

13. The position indicator according to claim 12, further comprising a case and a core body, wherein said electronic circuit board, said variable capacitor, said resonance circuit, and said core body are all accommodated in said case, such that one end of said core body protrudes from said case for indicating a position and another proximal end of said core body is provided to depress said dielectric contacting portion of the conductive elastic member toward said second surface portion of the dielectric when the depressing force is applied.

14. The position indicator according to claim 13, further comprising a core body coupling portion configured to couple said core body to said variable capacitor.

15. The position indicator according to claim 13, wherein the conductive elastic member further includes a core body coupling portion configured to coupled said core body to said variable capacitor.

16. The position indicator according to claim 15, wherein said core body coupling portion defines a hole configured to receive the another proximal end of said core body provided to depress said dielectric contacting portion.

17. The position indicator according to claim 15, further comprising a connection cap provided between said core body coupling portion and the another proximal end of said core body provided to depress said dielectric contacting portion.

18. An input device, comprising:
- a position indicator including a case, an elongated core body accommodated within the case and having one end thereof protruding from said case while having another end thereof accommodated within the case, a variable capacitor whose electrical capacitance changes when an external force is applied thereto through the other end of said core body, and an electronic circuit board having a first terminal portion and a second terminal portion coupled to the variable capacitor; and
- a position detector comprising a detection surface configured to detect a position indicated by said one end of the core body protruding from said case,
- wherein said variable capacitor of said position indicator includes a dielectric having a first surface portion and a second surface portion opposite to said first surface portion, and a conductive elastic member shaped as an enclosure defined by a bottom surface and a wall surface intersecting said bottom surface to enclose said dielectric, the enclosure forming a board coupling portion to receive at least a portion of the electronic circuit board therein, and the bottom surface of the enclosure forming a dielectric contacting portion,
- said first terminal portion is coupled to said first surface portion, said second terminal portion is coupled to said board coupling portion, and said dielectric contacting portion is disposed separately from said second surface portion so as to face said second surface portion and is configured to be deformed to come in contact with said second surface portion, and
- a contact area between said second surface portion and said dielectric contacting portion is changed in correspondence to a depressing force, which is applied against said dielectric contacting portion in a direction toward the dielectric through the other end of said core body, thereby changing an electrostatic capacitance of the variable capacitor.

19. The input device according to claim 18, wherein said position indicator includes a resonance circuit composed of a coil and said variable capacitor, said resonance circuit changes a resonance frequency in accordance with a change in electrical capacitance of the variable capacitor based on an external force applied thereto through said core body, and said position detector detects the change in resonance frequency as a pen pressure.

* * * * *